US012805489B2

(12) United States Patent
Salyer et al.

(10) Patent No.: US 12,805,489 B2
(45) Date of Patent: Nov. 24, 2026

(54) PET TOY TOPPER

(71) Applicant: The Kyjen Company, LLC, Centennial, CO (US)

(72) Inventors: Danielle Salyer, Denver, CO (US); Jeffrey Paris, Los Angeles, CA (US); Lynn Rosen, Parker, CO (US); Amanda Benham, Centennial, CO (US)

(73) Assignee: The Kyjen Company, LLC, Centennial, CO (US)

( * ) Notice: Subject to any disclaimer, the term of this patent is extended or adjusted under 35 U.S.C. 154(b) by 0 days.

(21) Appl. No.: 18/648,155

(22) Filed: Apr. 26, 2024

(65) Prior Publication Data

US 2024/0357999 A1 Oct. 31, 2024

Related U.S. Application Data

(60) Provisional application No. 63/463,210, filed on May 1, 2023, provisional application No. 63/462,897, filed on Apr. 28, 2023.

(51) Int. Cl.
*A01K 15/02* (2006.01)

(52) U.S. Cl.
CPC .................................. *A01K 15/026* (2013.01)

(58) Field of Classification Search
CPC .................................................... A01K 15/026
See application file for complete search history.

(56) References Cited

U.S. PATENT DOCUMENTS

| | | | |
|---|---|---|---|
| 5,148,769 A * | 9/1992 | Zelinger | A01K 15/025 119/708 |
| 5,823,844 A | 10/1998 | Markowitz | |
| 5,881,679 A | 3/1999 | Hann | |
| 6,318,300 B1 | 11/2001 | Renforth | |
| D453,240 S | 1/2002 | Simon | |
| 6,405,682 B1 | 6/2002 | Simon | |
| 8,418,657 B2 | 4/2013 | Dixon | |
| 8,506,345 B2 | 8/2013 | Tigan | |
| D724,279 S | 3/2015 | Paculdo | |
| D808,088 S | 1/2018 | Stone | |
| 11,141,668 B2 | 10/2021 | Lakritz | |
| D952,273 S | 5/2022 | Gao | |
| 12,076,658 B2 * | 9/2024 | Iwawaki | A63H 3/52 |
| 2004/0037635 A1 * | 2/2004 | Viscount | G09F 21/04 403/348 |
| 2007/0086607 A1 * | 4/2007 | Holsheimer | A63H 33/086 381/172 |
| 2012/0073032 A1 | 3/2012 | Tigan | |

(Continued)

OTHER PUBLICATIONS

International Search Report and Written Opinion for PCT/US2024/26632, mailed Aug. 22, 2024. (8 pages).

*Primary Examiner* — Kimberly S Berona
*Assistant Examiner* — Steven J Shur
(74) *Attorney, Agent, or Firm* — Lempia Summerfield Katz LLC

(57) ABSTRACT

Provided is an apparatus including an interchangeable base having a distal end and a proximate end, a toy end assembly coupled to the distal end of the interchangeable base, and at least one fastener extending from the proximate end of the interchangeable base. The at least one fastener is configured to removably couple the interchangeable base to an item.

19 Claims, 28 Drawing Sheets

(56) References Cited

U.S. PATENT DOCUMENTS

| | | | | |
|---|---|---|---|---|
| 2012/0192806 | A1 | 8/2012 | Dixon | |
| 2012/0234258 | A1 * | 9/2012 | Cook | A01K 15/025 119/708 |
| 2014/0338613 | A1 | 11/2014 | Suring | |
| 2015/0027382 | A1 * | 1/2015 | Mc Cafferty | A01K 15/025 119/707 |
| 2016/0096117 | A1 * | 4/2016 | Resh | A63H 33/006 446/227 |
| 2017/0006831 | A1 | 1/2017 | Zhang | |
| 2020/0054953 | A1 | 2/2020 | Lakritz | |

* cited by examiner (a)

(b)

(c)

PET TOY TOPPER

CROSS-REFERENCE TO RELATED APPLICATION

This application claims priority to U.S. Provisional Patent Application Ser. No. 63/462,897 entitled "Pet Toy Topper", filed Apr. 28, 2023 and U.S. Provisional Patent Application Ser. No. 63/463,210, entitled "Figure 8 Cat Track Toy," filed on May 1, 2023, the disclosure of which is incorporated by reference herein in its entirety.

BACKGROUND

Field of the Disclosure

The disclosure relates generally to pet toys, and more specifically, to an interactive and interchangeable pet toy configured to attach to an item or product.

Brief Description of Related Technology

Generally, a wide variety of pet toys and amusement devices are available to keep pets entertained. For example, pet toys include squeaky toys, designed to make noise entertaining pets; balls and frisbees, designed to entertain pets while encouraging exercise; plush toys; and the like. However, in addition to keeping pets entertained, it is important to provide pets with mental stimulus in order to improve their overall health and behavior. Accordingly, there is a need for interactive pet toys that attract and mentally stimulate pets by attracting and keeping their attention. Additionally, there is a need for interactive pet toys that encourage the pet to engage with the toy again in the future.

SUMMARY

In accordance with one aspect of the present disclosure, an apparatus includes an interchangeable base having a distal end and a proximate end. The apparatus also includes a toy end assembly coupled to the distal end of the interchangeable base and at least one fastener extending from the proximate end of the interchangeable base. The at least one fastener is configured to removably couple the interchangeable base to an item.

In accordance with another aspect of the present disclosure, a toy connection assembly includes an interchangeable base, a toy coupled to one end of the interchangeable base, and a fastener extending from another end of the interchangeable base. The fastener is configured to removably couple the interchangeable base to another toy.

In accordance with yet another aspect of the present disclosure, an interchangeable toy system includes a base product and a set of toys. Each toy of the set of toys is selectable and removably attachable to the base product.

BRIEF DESCRIPTION OF THE DRAWING FIGURES

For a more complete understanding of the disclosure, reference should be made to the following detailed description and accompanying drawing figures, in which like reference numerals identify like elements in the figures.

DETAILED DESCRIPTION

Figure 1:
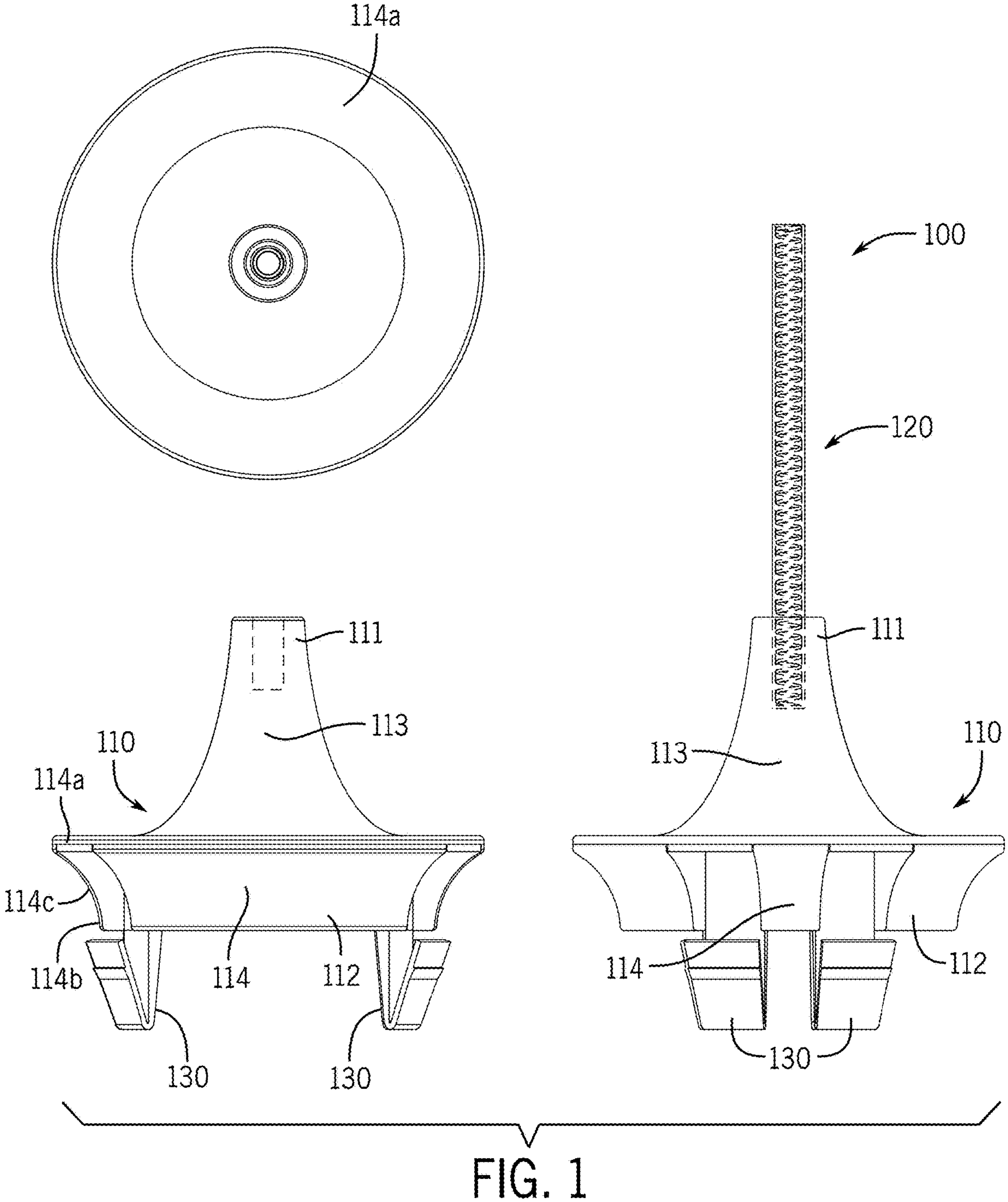
FIG. 1 depicts a pet toy topper with an interchangeable base and a toy end assembly according to one embodiment.

The following description of certain examples of the technology should not be used to limit its scope. Other examples, features, aspects, embodiments, and advantages of the technology will become apparent to those having ordinary skill in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

The terms “comprise” (and any form of comprise, such as “comprises” and “comprising”), “have” (and any form of have, such as “has” and “having”), “include” (and any form of include, such as “includes” and “including”) and “contain” (and any form of contain, such as “contains” and “containing”) are open-ended linking verbs. As a result, a device or apparatus that “comprises,” “has,” “includes” or “contains” one or more elements possesses those one or more elements, but is not limited to possessing only those one or more elements. Likewise, an element of a system, device, or apparatus that “comprises,” “has,” “includes” or “contains” one or more features possesses those one or more features, but is not limited to possessing only those one or more features.

Spatial and functional relationships between elements are described using various terms, including “connected,” “engaged,” “interfaced,” “on,” and “coupled.” Unless explicitly described as being “direct,” when a relationship between first and second elements is described in the present disclosure, that relationship encompasses a direct relationship where no other intervening elements are present between the first and second elements, and also an indirect relationship where one or more intervening elements are present (either spatially or functionally) between the first and second elements. In contrast, when an element is referred to as being “directly” connected, engaged, interfaced, on, or coupled to another element, there are no intervening elements present. Other words used to describe the relationship between elements should be interpreted in a like fashion (e.g., “between,” versus “directly between,” “adjacent,” versus “directly adjacent,” and the like.).

For clarity of disclosure, the terms “proximal” (or “proximate”) and “distal” are defined herein relative to an item, such as a pet toy or product. The term “proximate” or “proximal” refers the position of an element closer to the item (pet toy or product). The term “distal” refers to the position of an element further away from the item. In addition, the terms “upper,” “lower,” “lateral,” “transverse,” “bottom,” “top,” are relative terms to provide additional clarity to the figure descriptions provided below. The terms “upper,” “lower,” “lateral,” “transverse,” “bottom,” “top,” are thus not intended to unnecessarily limit the technology or inventive concepts described herein.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term “or” should generally be understood to mean “and/or”, etc.

The present disclosure is provided to solve the above-mentioned problems in the Background of the Disclosure section. Specifically, the present disclosure provides a pet toy topper that attracts and mentally stimulates a pet. A pet toy topper is a type of pet toy accessory that is designed to enhance and upgrade an item or object, such as another pet toy or product. The disclosed pet toy topper is a detachable item that can be placed on top of another item, such as a pet toy having a tower of tracks (or figure 8 track) that toy balls revolve around, or other pet products, such as a cat scratcher (i.e., a scratch pad, such as a piece of corrugated cardboard). In this way, the pet toy topper is an accessory that can be used with other products. The pet toy topper may also be attachable to a separate base, such that the pet toy topper becomes a stand-alone toy. The pet toy topper may come in a variety of shapes and sizes. One of the main purposes of a pet toy topper is to stimulate a pet’s natural hunting and play instincts. By adding an additional element to a pet toy or product, the topper can help to keep a pet engaged and entertained for longer periods of time and can re-engage a pet with a toy that the pet has become bored with. Overall, a pet toy topper can be a fun and effective way to enhance a pet’s playtime and provide them with mental and physical stimulation.

Referring generally to the figures, a pet toy topper according to the present disclosure may include an interchangeable base or body portion, a toy end assembly, and at least one fastener or attachment/coupling means. The interchangeable base has a distal end and a proximate end, and the toy end assembly is coupled to the distal end of the interchangeable base. The at least one fastener couples or connects the interchangeable base to an item, such as a toy or pet product. The at least one fastener may extend from the proximate end of the interchangeable base and is configured to removably couple the interchangeable base to the item (another pet toy or product). In other examples, an end of the interchangeable base or body portion is shaped and configured to allow the interchangeable base to nest within (or rest upon) an opening of the item.

The interchangeable base is designed to be able to connect to other toys or products by way of the one or more fasteners. For example, the interchangeable base may fit within (i.e., nest within) a top of another toy, such as a tower of tracks or figure 8 track type toy that includes multiple tracks with balls that roll around the tracks. The interchangeable base may fit within or attach to other toys or products as well. In this regard, the interchangeable base is a detachable/re-attachable toy for attaching to another toy or product, such as the top of another toy or product. In another embodiment, the at least one fastener allows the interchangeable base (and the toy end assembly coupled thereto) to be used with other pet products, such as pet scratch pads. Therefore, the interchangeability of the toy topper turns the toy toppers into accessories that can be used with any number of different toys and/or products.

The size and shape of the interchangeable base may vary, but in general the interchangeable base includes a first or bottom portion and a second or top portion. The first portion of the interchangeable base includes the proximate end of the interchangeable base, and the at least one fastener is attached or otherwise coupled to the first portion. The first portion of the interchangeable base is the part of the interchangeable base that fits within or nests with, or otherwise couples to, an item, such as another toy or pet product (e.g., by way of the fasteners or other connection means). In this regard, in one embodiment, the first portion is sized and shaped to correspond to an opening or area of the item, such as an opening in the top of another toy. The second portion of the interchangeable base is coupled to and extends away from the first portion. The second portion includes the distal end of the interchangeable base, and the toy end assembly is coupled to the second portion.

While the size and shape of the first portion may generally stay the same for a particular design (in order to attach to a particular item, such as another toy), the size, shape, and configuration of the second portion may vary, depending on the type of toy end assembly being used with the interchangeable base. For example, in one embodiment the top portion (i.e., second portion) of the interchangeable base may be conically shaped. In another embodiment, the top portion may be dome-shaped or spiral-shaped. In yet another example, the top portion may include a plurality of protruding arms that support the toy end assembly therebetween. Any number of different shapes are possible, depending on the type of toy assembly (i.e., attractant or lure to entice the pet to play) that is to be attached to the interchangeable base, as shown below. In some examples, the second or top portion of the interchangeable base may be part of the toy end assembly. In other words, the second portion of the interchangeable base may include components designed to interact with the pet. Various example embodiments are shown in the disclosed figures and described below. The size, shape, and configuration of the first portion may vary depending on which other toy the interchangeable base is to be attached to. The fastener(s) used may vary as well, depending on what toy or product the interchangeable base is to be coupled to.

Some toy toppers may be purely mechanical in nature, such as a rigid interchangeable base with a flexible toy topper having a lure or attractant at the end (e.g., feather, string, ball, or small toy). Other toy toppers may be electrical, where the interchangeable base includes a power source, such as batteries, to power a motor that drives movement of one or more components. These electrical toy toppers may also include motion and automatic sensors as well. Examples are shown in the figures and descriptions provided herein.

In one embodiment, the disclosed toy end assembly includes an elongate member or wand having a first end and a second end. The first end is coupled to the distal end of the interchangeable base and the second end is coupled to a toy, lure, attractant, or the like (e.g., something that attracts the attention of an animal). In one example, such as the simple mechanical example mentioned above, the elongate member is flexible, such as a spring, that extends outwardly from the second (top) portion of the interchangeable base in a generally straight manner. The toy at the end of the elongate member can be any number of things. For example, it could be simply a feather, faux fur, a ball, a string, a bunch of feathers or strings, a small plush toy, a small plastic or otherwise chewable toy, or any combinations thereof, such a small plush toy with feathers, etc. Given the spring-like nature of the elongate member in the example above, the toy at the end of the elongate member is moveable in relation to the interchangeable base. In other words, as the pet engages/plays with the toy at the end of the spring, the toy is capable of bending in many different directions about the base. The interchangeable base and elongate member are both designed to withstand the force of animals playing with (e.g., biting, swatting, tugging, grasping, and the like) the disclosed pet toy topper.

In another example, the elongate member or wand may be curved or arcuate, extending away from the interchangeable base in a generally upwards and sidewards manner (e.g., starts off extending straight out from the base, and then curves, leans, or bends toward one side of the base). In one example, the arcuate elongate member is rotatably and removably coupled to the distal end of the interchangeable base, such that the elongate member and attached toy are rotatable in relation to the interchangeable base. In one embodiment, the elongate member is simply free to spin while coupled to the interchangeable base. In another embodiment, the elongate member is connected to a drive shaft and motorized and powered by a power source (e.g., battery) to spin/rotate about the base. In some cases the arcuate elongate member can spin in 360 degrees in one direction, both directions, or back and forth in varying degrees of rotation, such as to keep the pet engaged with the toy. In this case, the power source and/or motorized component controls movement of the toy end assembly.

The toy coupled or connected to the elongate member is also variable and interchangeable. In this regard, the toy may be removably coupled to the second end of the elongate member. This way, the toy can be swapped out with other toys to change the configuration of the toy end assembly.

The at least one fastener, or plurality of fasteners in some cases, can be any sort of fastener(s) or attachment/coupling means, such as press-fit fasteners, friction-fit fasteners, snaps, threads, magnets, or combinations thereof, that allows the interchangeable base to be coupled to an item, such as another toy or product. In some examples, the interchangeable base may simply have a shape or design that allows the interchangeable base to fit within (e.g., pressure fit, friction fit, or nesting fit) the other toy or product.

Referring generally to the figures, a pet toy topper according to the present disclosure includes an interchangeable base and a toy end assembly. The figures also show different versions of various pet toy toppers and configurations with other items, such as other pet toys or products. The dimensions shown in any of the figures are exemplary only, and many other sizes and shapes may be used.

FIG. 1 shows an example apparatus (i.e., pet toy topper 100) for interaction of a pet animal. FIG. 1 shows a top, front and side view of the pet toy topper 100. In the example shown in FIG. 1, the interchangeable base 110 is the central portion (or main body portion), the toy end assembly 120 is the spring extending from the distal end 111 of the interchangeable base 110, and the at least one fastener 130 or coupling device extends from the bottom or proximate end 112 of the interchangeable base 110. In one embodiment, the first (top) portion 113 (or upper housing) of the interchangeable base 110 of FIG. 1 is conically shaped. As shown and described below, other shapes of the first (top) portion 113 of the base 110 are possible.

The second (bottom) portion 114 (or lower housing) of the interchangeable base 110 has a top end or surface 114_a_, a bottom end or surface 114_b_ (i.e., the proximate end 112 of the base 110), and an outer sidewall (or walls, depending on the shape of the second portion 114 of the base 110) 114_c_ that tapers down from the top end 114_a_ to the bottom end 114_b_. In the example shown in FIG. 1, the top end 114_a_ and bottom end 114_b_ are circular shaped, such that there is a single circular sidewall 114_c_ wrapping around the perimeter of the second portion 114. However, other shapes are possible. The size, shape, and configuration of the second portion 114 of the interchangeable base 110, and specifically the top end 114_a_, bottom end 114_b_, and sidewall(s) 114_c_, are designed to correspond to an opening of an item, such as another toy or product, as shown below.

In one example, the toy end assembly 120 (spring in FIG. 1) is fixedly attached to the top portion 113 of the base 110, but in other examples the toy end assembly 120 is removably attached to the base 110 (as described below).

Figure 2A:
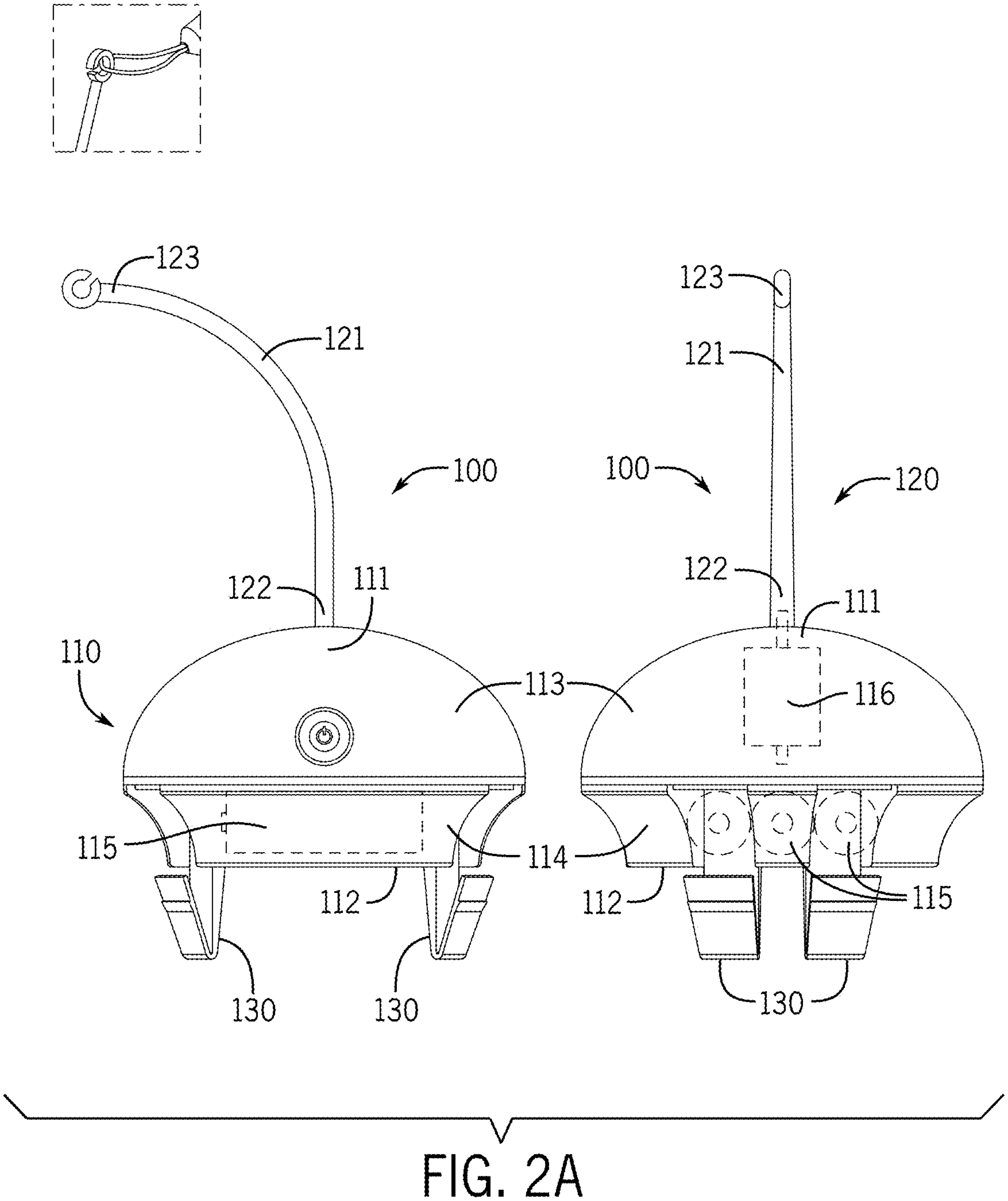
FIG. 2A depicts another pet toy topper with an interchangeable base according to one embodiment.

FIG. 2A shows another example of a pet toy topper 100. In this example, the upper portion 113 (or upper housing) of the interchangeable base 110 is dome-shaped. The bottom portion 114 (or lower housing) of the interchangeable base 110 may be the same as that shown in FIG. 1. The toy end assembly 120 of FIG. 2A includes a wand or an arcuate elongate member 121 that extends away from the base 110. The arcuate elongate member 121 has a first (proximate) end 122 attached to the distal end of the base 110 and a second (distal) end 123 opposite the first end 122. The proximate end 122 of the arcuate elongate member 121 may be rotatably and removably attached to the base 110. In one example, the proximate end 122 of the arcuate elongate member 121 may be connected to a drive shaft used to rotate the elongate member 121 by a snap-fit connection, such that the elongate member can be removed and interchanged or swapped out with other toy end assemblies 120. The arcuate elongate member 121 also includes an attachment portion at the second (distal) end 123, such that a toy (e.g., lure/attractant) can be removably attached to the distal end 123 of the arcuate elongate member 121. As shown in the inset diagram of FIG. 2A, the attachment portion of the distal end 123 of the arcuate elongate member 121 includes a small opening, such that a loop (e.g., string or cord) of the toy/lure/attractant can be inserted into the small opening to be removably attached thereto.

Figure 2B:
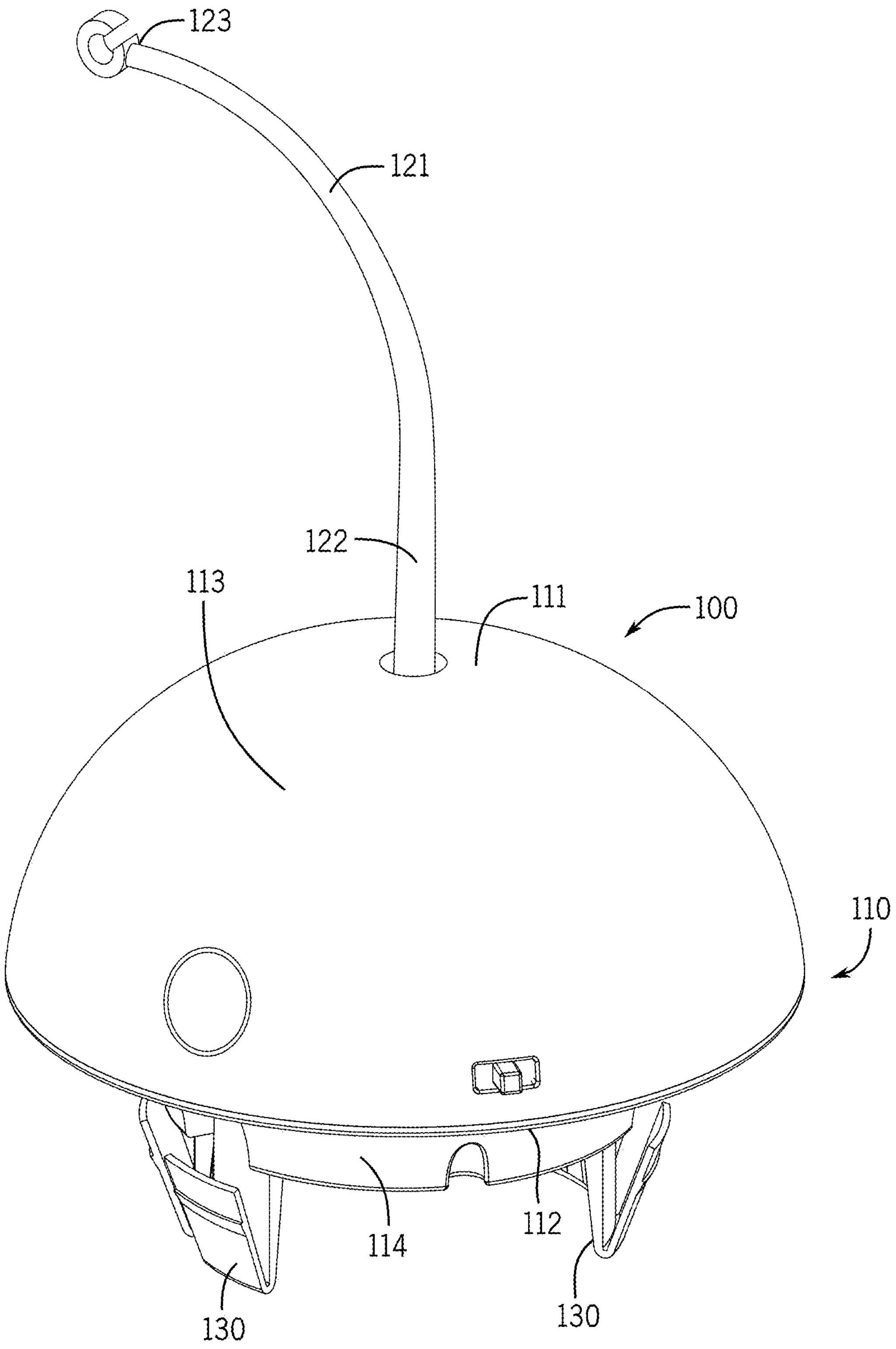
FIG. 2B depicts a perspective view of the pet toy topper of FIG. 2A according to one embodiment.

The interchangeable base 110 of FIG. 2A also includes a motorized component 116 (e.g., a motor) powered by a power source 115 (e.g., one or more batteries) that controls movement of the arcuate elongate member 121, such that the arcuate elongate member 121 can rotate/spin around the base 110. In another example, the motorized component 116 may also control the arcuate elongate member 121 to move up/down (i.e., inward/outward) with respect to the base 110. An on/off button may be located on an outer surface of the interchangeable base 110 to power the device on/off and/or to control the direction and/or speed of movement of the elongate member 121, as shown in FIG. 2B. In other embodiments, motion sensors or automatic sensors may be included, such that the motor activates automatically upon detection by one or more sensors. In one example, the interchangeable base 110 may include a motion sensor that detects movement nearby. When motion is detected, the motor may activate and initiate rotation of the arcuate elongate member 121.

FIG. 2B is another illustration of the pet toy topper 100 of FIG. 2A. In addition to the power on/off switch, the interchangeable base 110 may include other control switches to control other operations of the arcuate elongate member 121, such as speed and/or direction of rotation. As indicated above, sensors, such as motion or automatic sensors, may be included as well. These switches and/or sensors may be disposed on the upper portion 113 of the base 110.

Figure 2C:
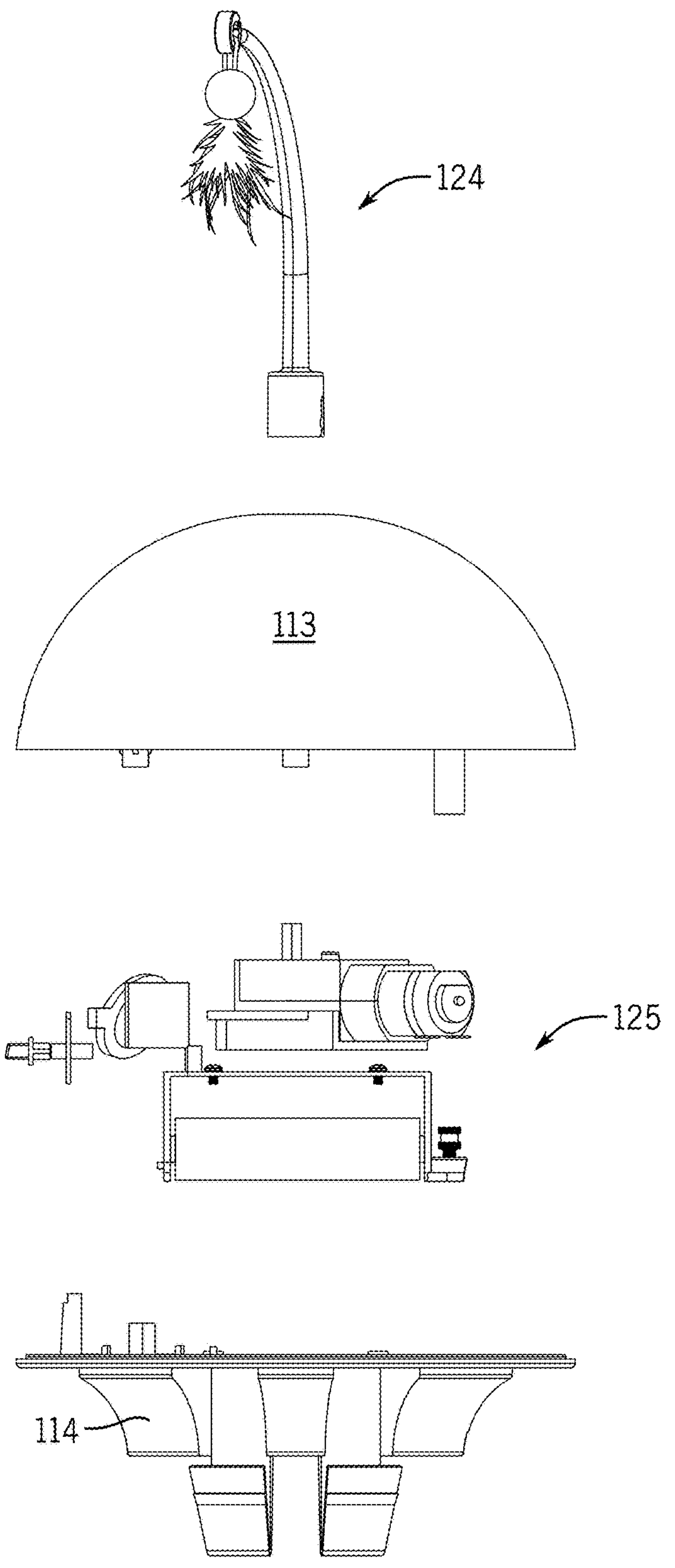
FIG. 2C depicts an exploded view of the pet toy topper of FIG. 2A according to one embodiment.

FIG. 2C is an exploded view of the pet toy topper 100 of FIGS. 2A and 2B. The exploded view of FIG. 2C shows the motor 125 disposed between the upper portion 113 and lower portion 114 of the base 110. FIG. 2C also shows the lure/attractant 124 removably attached to the distal end 123 of the arcuate elongate member 121.

Figure 3:
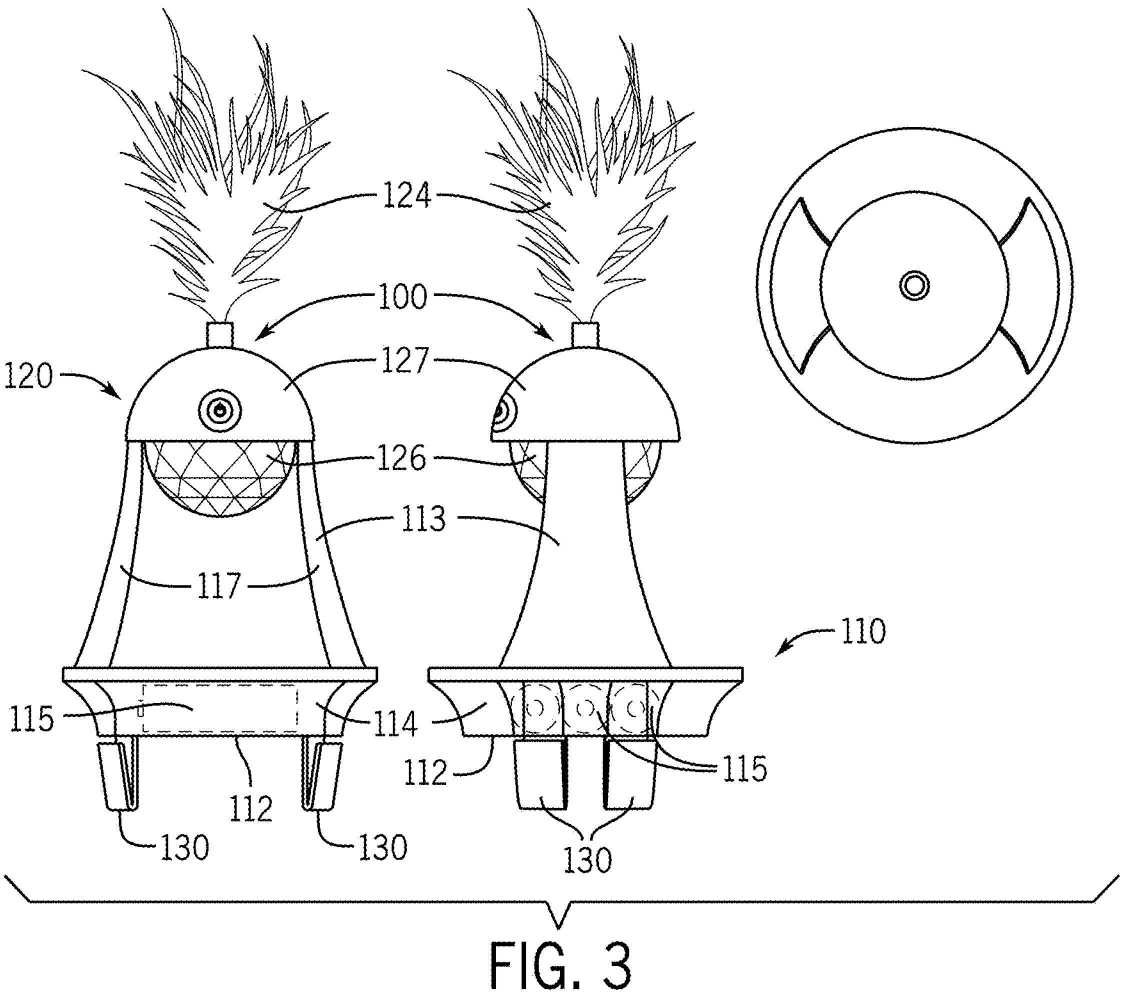
FIG. 3 depicts another pet toy topper with an interchangeable base according to one embodiment.

FIG. 3 is yet another example of a pet toy topper 100. As shown in FIG. 3, the upper/top/first portion 113 of the interchangeable base 110 includes a plurality of protruding arms 117, such that the toy end assembly 120 is disposed between the plurality of protruding arms 117. In this example, the toy end assembly 120 includes a disco ball portion 126 and a lure/attractant portion 124, where the lure/attractant 124 portion includes feathers. In one embodiment, the disco ball portion 126 may be able to rotate/spin within a top portion 127 of the toy end assembly 120. In this example, a light source may be included in the top portion 127 as well to shine into or on the disco ball portion 126. In this example, the disco ball portion 126 may include a reflective, multi-faceted surface. In another embodiment, a light source, such as a multi-colored light emitting diode (LED), may be disposed within either the top portion 127 or the disco ball portion 126. In this example, the disco ball portion 126 may be a translucent disco ball (e.g., sphere) having a multi-faceted surface. The multi-faceted surface of the disco ball portion 126 allows light shining through it to be refracted in different directions. In this way, when the light source shines through the multi-faceted surface of the disco ball portion 126, the disco ball portion 126 may appear to move (e.g., spin) due to different colors of the multi-colored LED being slightly off center. The light source and the disco ball portion 126 may be powered by the power source 115 (batteries) in the bottom portion 114 of the base 110, as shown. Wiring connecting the power source 115 to the light source and the disco ball portion 126 for controlling the light and disco ball may be included inside the protruding arms 117. The bottom portion 114 of the base 110 may be the same as discussed above. Similar to above, the upper portion 113 may also include power and/or motion control switches and sensors.

Figure 4A:
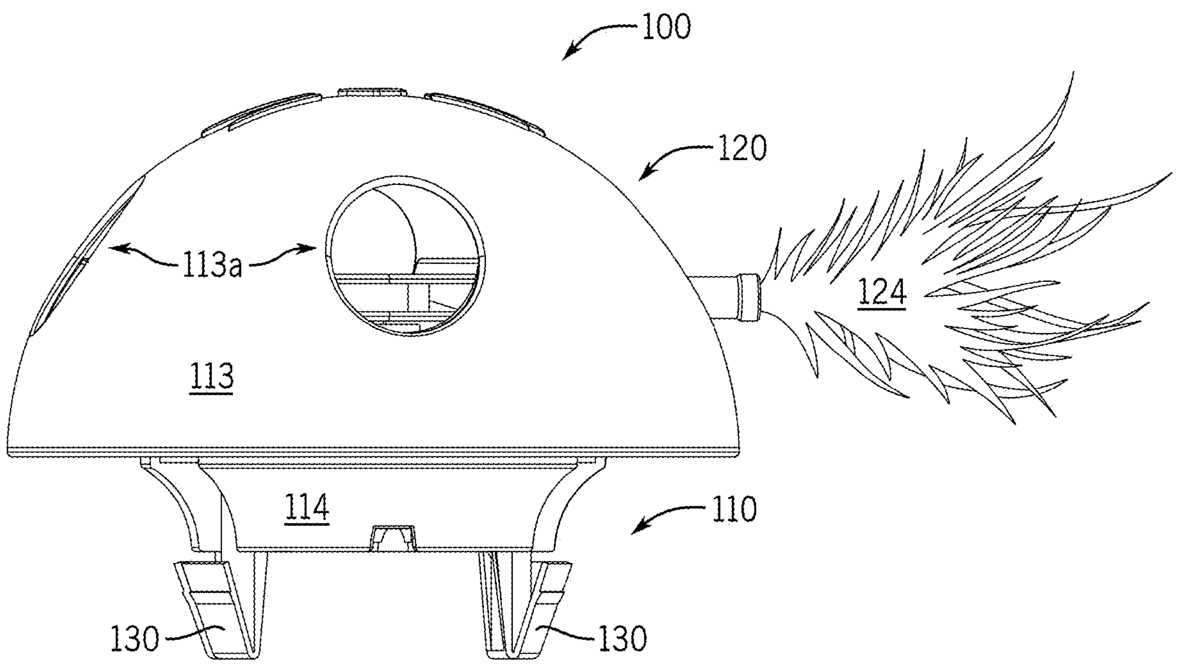
FIG. 4A depicts a side view of another pet toy topper with an interchangeable base according to one embodiment.

FIGS. 4A-4D are yet another example of a pet toy topper 100. The pet toy topper 100 of FIGS. 4A-4D is another example of a toy topper 100 having a motorized toy end assembly 120. As shown in FIG. 4A, the lower portion 114 and fasteners 130 of the interchangeable base 110 is the same as those described above. The top portion 113 of the base 110 is dome-shaped, similar to FIGS. 2A and 2B above. However, the top portion 113 of FIGS. 4A-4D has a plurality of openings or holes 113*a* therein to allow a lure/attractant/toy 124 to be moved inward/outward out of and into the openings or holes 113*a* to entice or entertain a pet. This movement may be electronically controlled by a motor 125 and/or motion or automated sensors, similar to the motorized pet toy topper 100 described above.

Figure 4B:
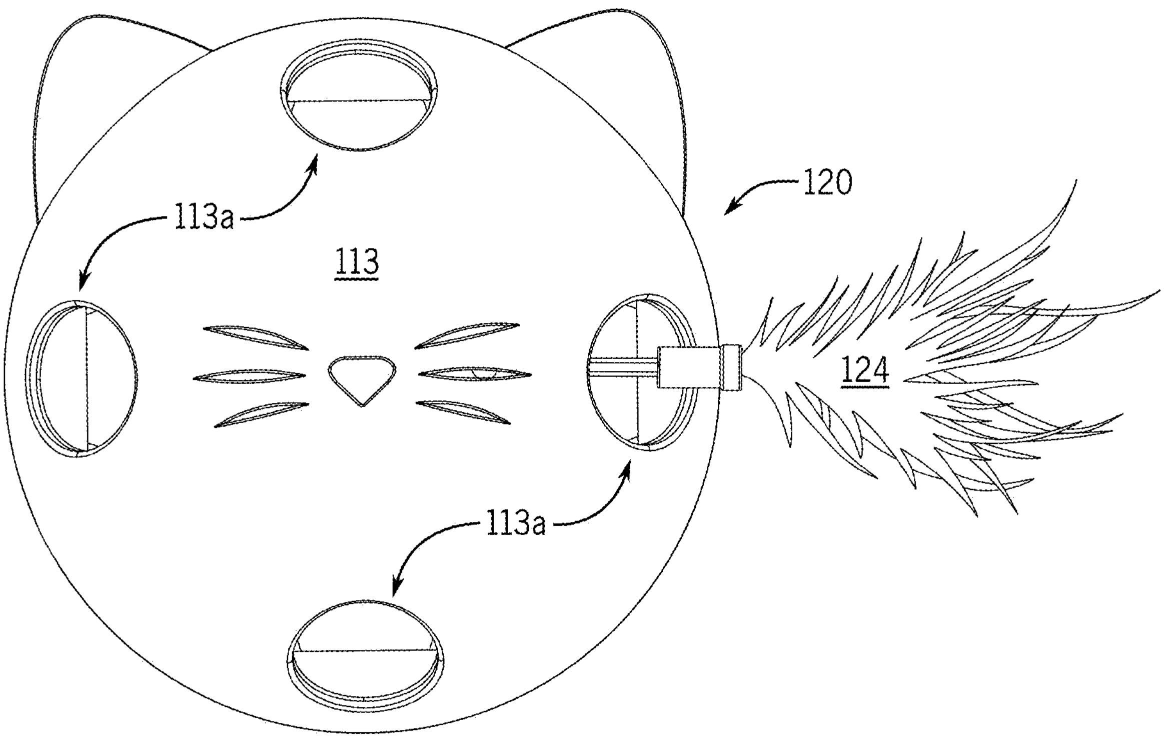
FIG. 4B depicts a top view of the pet toy topper of FIG. 4A according to one embodiment.

FIG. 4B is a top view of the pet toy topper 100 of FIG. 4A. In the example shown in FIG. 4B, the upper portion 113 of the base 110 includes four openings or holes 113*a* in the upper portion 113. However, more or fewer openings 113*a* may be used.

Figure 4C:
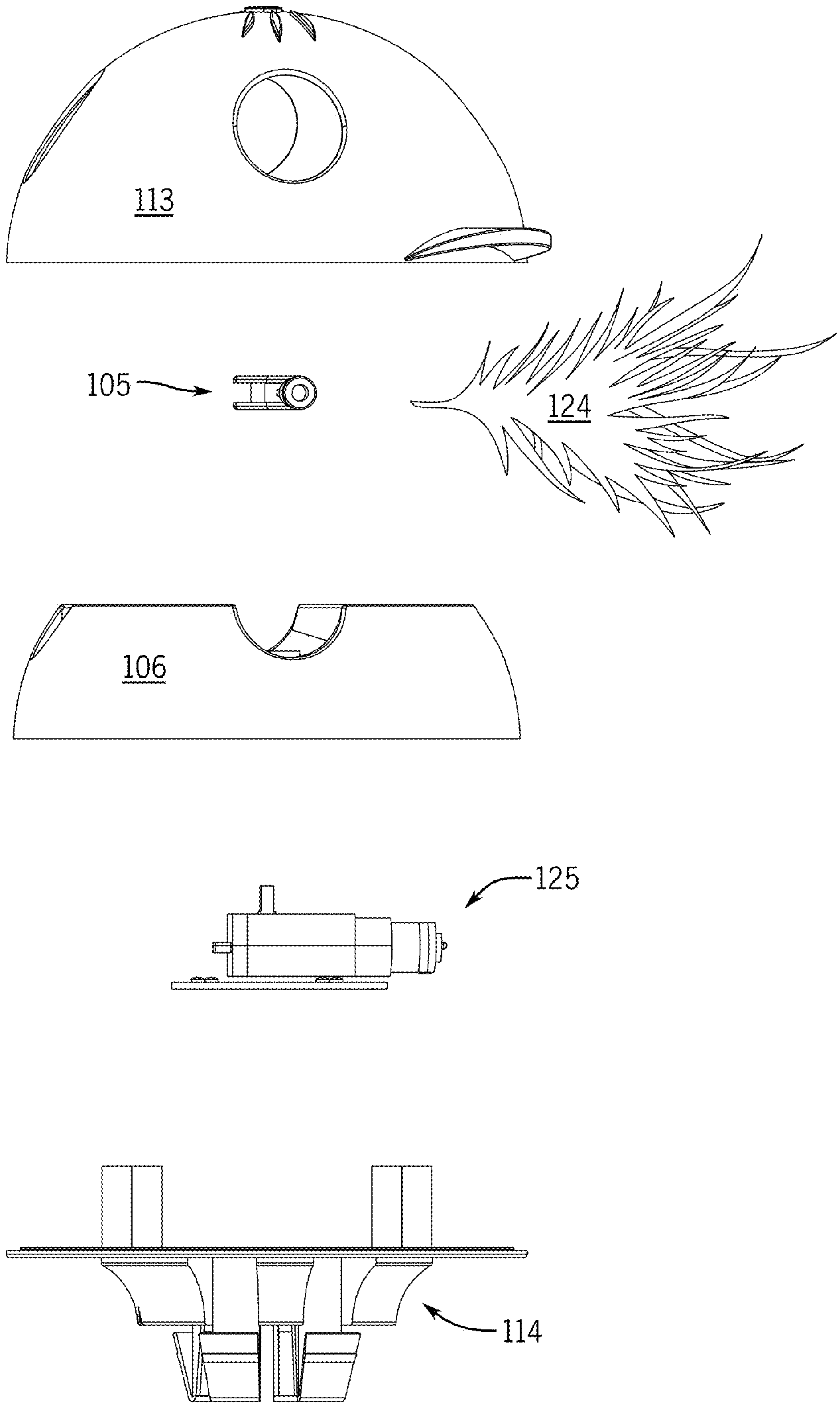
FIG. 4C depicts an exploded side view of the pet toy topper of FIG. 4A according to one embodiment.

FIG. 4C is an exploded side view of the pet toy topper 100 of FIGS. 4A and 4B. FIG. 4C shows the motor 125 disposed between the lower portion 114 and upper portion 113 of the base 110. Also shown in FIG. 4C is a spinner 105 and inner track 106 disposed between the upper portion 113 and lower portion 114, which are described below with reference to FIG. 4D.

Figure 4D:
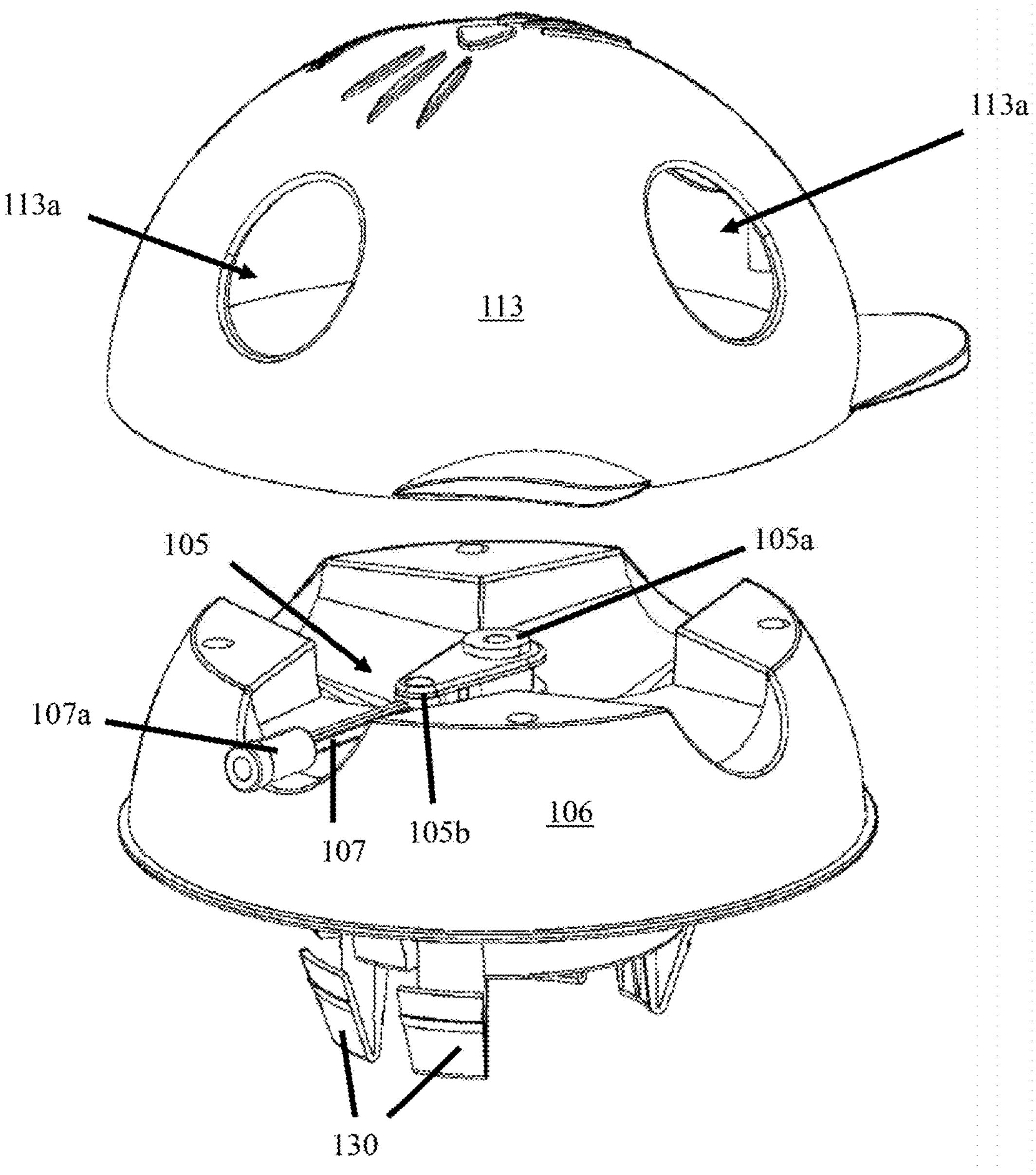
FIG. 4D depicts a partial exploded perspective view of the pet toy topper of FIG. 4A according to one embodiment.

FIG. 4D is a partial exploded perspective view of the pet toy topper 100 of FIGS. 4A-4C. As shown in FIG. 4D, the inner track 106 includes a number of tracks or pathways (channels or grooves) that correspond to the number of openings or holes 113*a* in the upper portion 113 of the base 110. The tracks or pathways in the inner track 106 converge or intersect at the center of the inner track 106. The spinner 105 is disposed at the center of the inner track 106. More specifically, the spinner 105 has a first end 105*a* and a second end 105*b*, and the first end 105*a* of the spinner 105 is rotatably coupled to the center of the inner track 106 (e.g., by a rotating shaft or axle/bushing arrangement or other type of bearing element), such that the spinner 105 is operable to spin 360 degrees within the inner track 106. A wand 107 is rotatably coupled to the second end 105*b* of the spinner 105 (also a rotating shaft or axle/bushing arrangement or other type of bearing element) and an attachment portion 107*a* is disposed at an outer end of the wand 107. The attachment portion 107*a* of the wand 107 is configured to receive the lure/attractant/toy 124. The motor 125 controls the spinner

105 and wand 107 in such a way that the wand 107 with the lure/attractant/toy 124 attached is operable to retract into the inner track 106 from one opening or hole 113*a* and pathway or track and then extend out through another track or pathway through a different opening or hole 113*a* in the upper portion 113 of the base 110. In one example, an internal rubber bushing may be disposed between the first end 105*a* and the rotating shaft or axle/bushing arrangement, such that the spinner 105 may be in a held position while the rotating shaft or axle/bushing arrangement spins. In this way, if a pet were to grasp or hold the lure/attractant/toy 124 or the wand 107, the spinner 105 would be allowed to slip (i.e., the rotating shaft or axle could spin freely in the bushing) without damaging the motor.

Figure 5A:
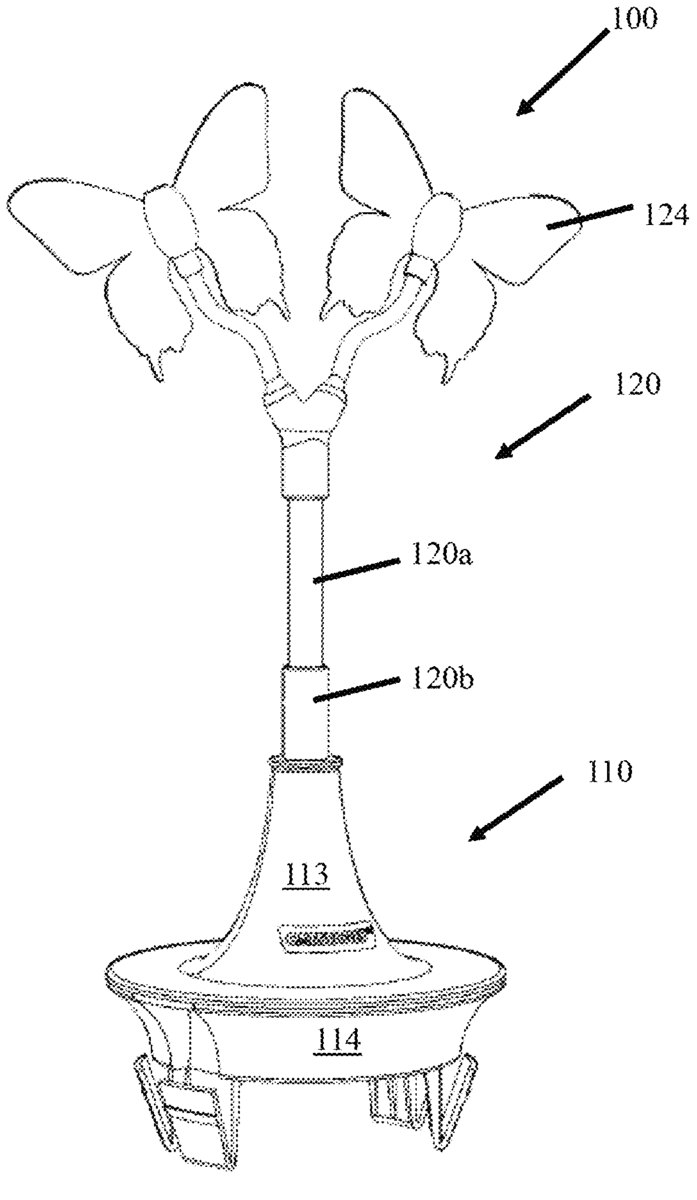
FIG. 5A depicts a perspective view of a pet toy topper with an interchangeable base and a toy end assembly according to one embodiment.
Figure 5B:
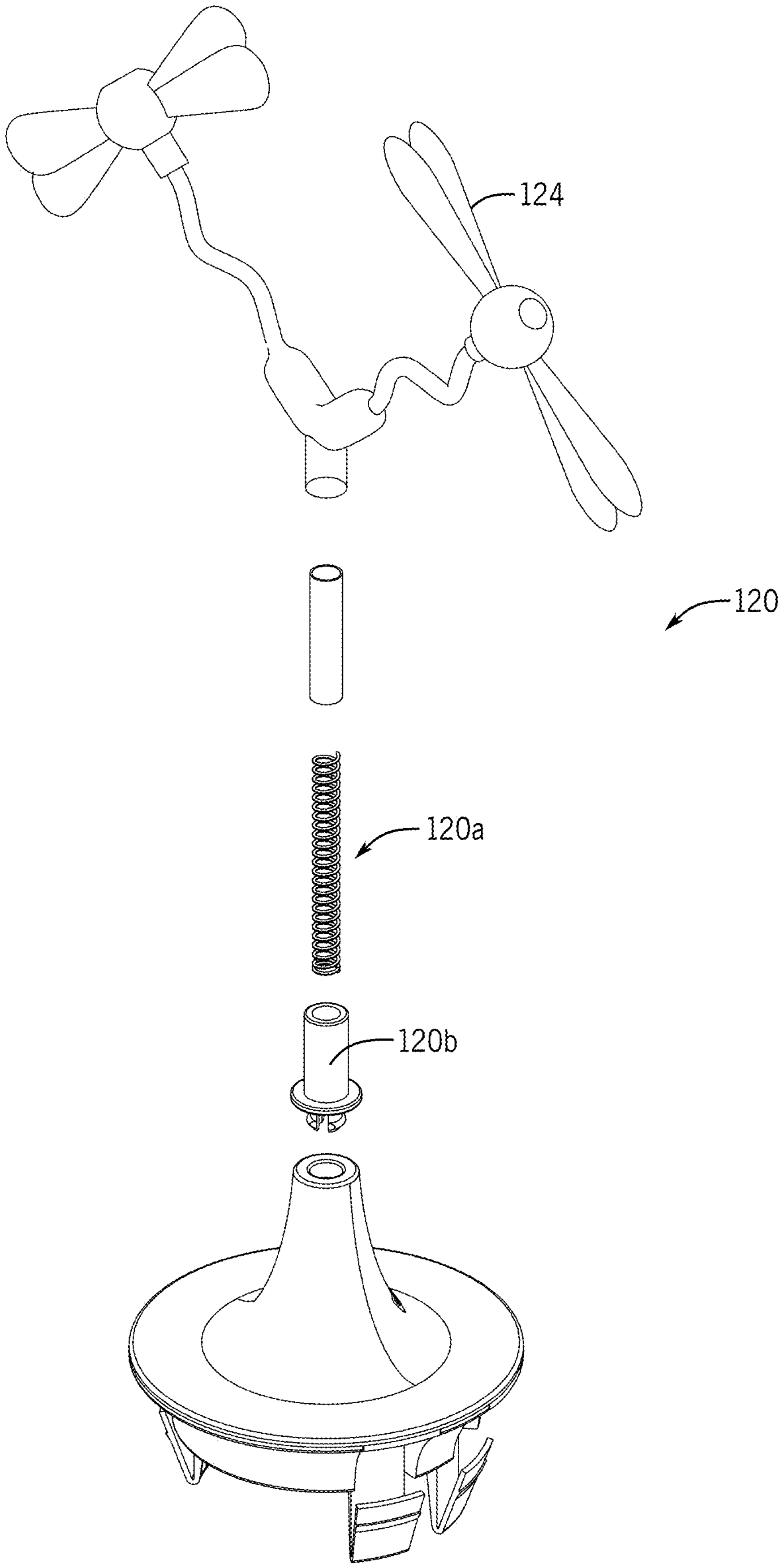
FIG. 5B depicts an exploded perspective view of the pet toy topper of FIG. 5A having a different toy end assembly according to one embodiment.

FIGS. 5A and 5B illustrate another example of a pet toy topper 100. The toy topper 100 of FIGS. 5A and 5B includes an interchangeable base 110 having a bottom portion 114 and a top portion 113. The toy topper 100 also includes a toy end assembly 120 having a main body or stem 120*a*, a bottom coupler 120*b* attached to the top portion 113 of the base 110, and a toy 124 attached to the stem 120*a*. The type of toy 124 attached to the stem 120*a* can vary, and may include various types of lures or attractants, such as lures representing animals (e.g., butterflies, dragonflies, etc.). In one example, the toy 124 may be rotatably attached to the stem 120*a*, such that the toy 124 can spin around the stem 120*a*. As shown in FIG. 5B, the stem 120*a* may include a spring and outer sleeve.

Figure 6:
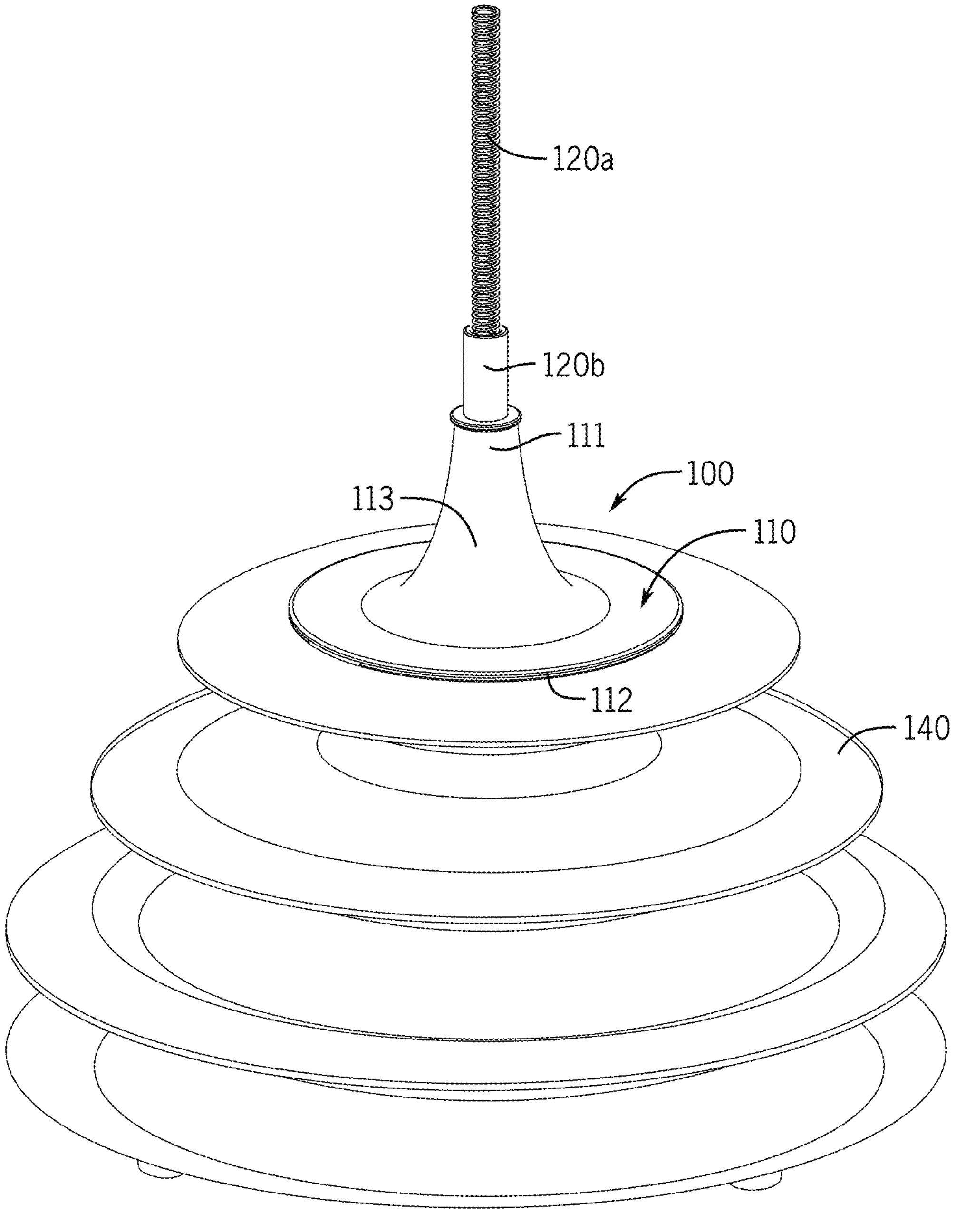
FIG. 6 depicts the pet toy topper of FIG. 1 coupled to an item according to one embodiment.

FIG. 6 shows the pet toy topper 100 of FIG. 1 attached to an item 140 (e.g., toy 140). As shown in FIG. 6, the bottom portion 114 of the interchangeable base 110 is nested within an opening of the item 140. In the example shown in FIG. 6, the item 140 is a toy 140 having multiple tracks stacked in a tower configuration. A ball or other play thing may be disposed in the tracks to entice a pet to interact with the toy 140. The interchangeable base 110 may be attached to or nested within other products, as described below in more detail.

Figure 7:
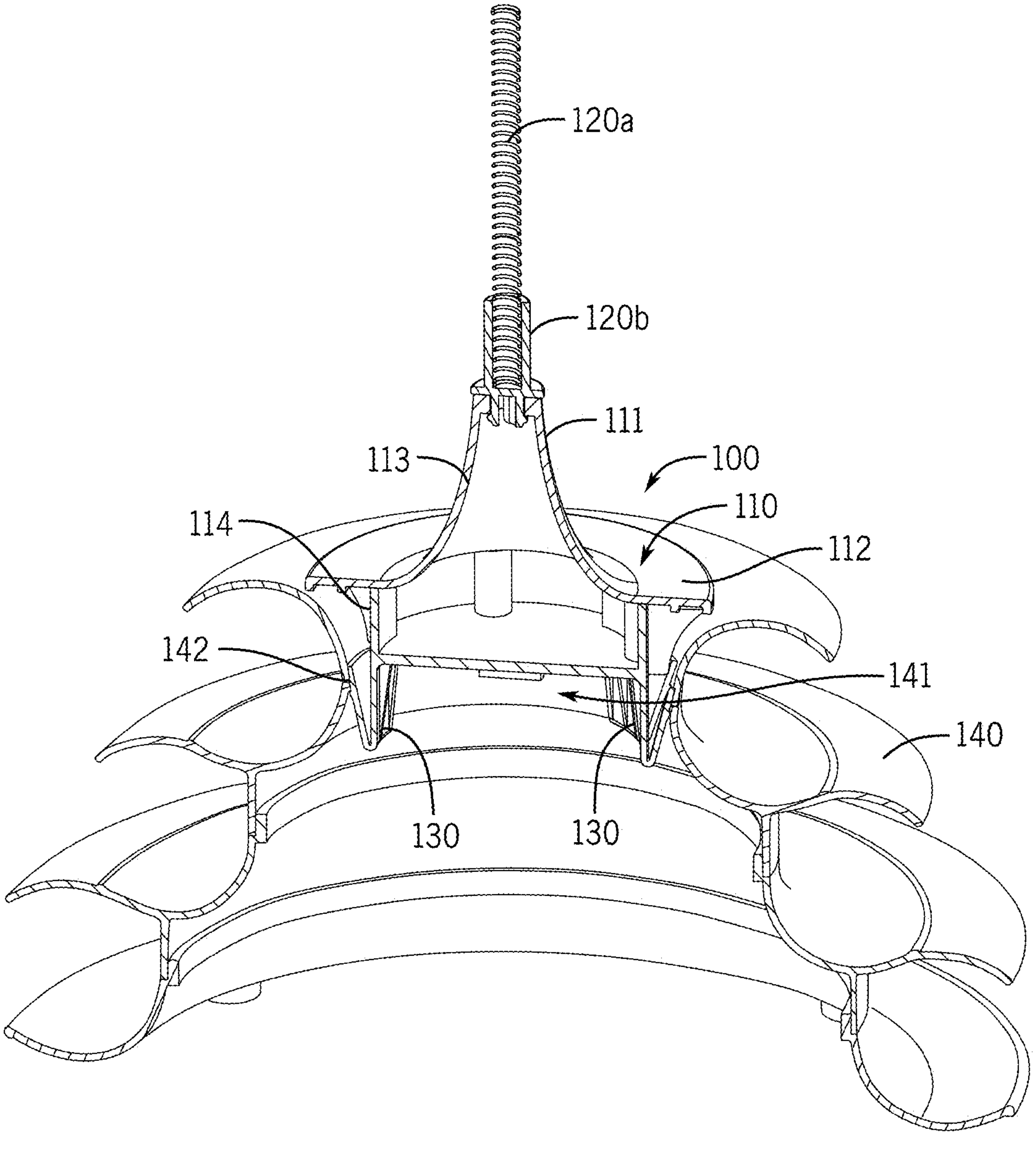
FIG. 7 depicts a cross-sectional view of the pet toy topper and item of FIG. 6 according to one embodiment.

FIG. 7 shows a cross-section of the pet toy topper 100 and item 140 of FIG. 6. As shown in FIG. 7, the plurality of fasteners 130 of the interchangeable base 110 are configured to engage/connect with an opening portion 141 of the item 140, such as a lip portion 142 of the item 140. In one example, the plurality of fasteners 130 are snap-fit fasteners 130, where a portion of the fasteners 130 is compliant and flexible, such that when the fasteners 130 are pressed downward to engage with the lip portion 142 of the item 140, the fastener 130 bends/flexes allowing the base 110 to be inserted into the item 140, but once the fasteners 130 pass the lip portion 142, the compliant portion snaps back to its original position and prevents the base 110 from being lifted/removed from the item 140. To release/remove the interchangeable base 110, the compliant portion of the fasteners 130 are pressed inwardly, thus allowing the fasteners 130 to disengage from the lip portion 142 and be lifted out of the opening portion 141 of the item 140. The configuration described above offers a large degree of flexibility and modularity, since it allows the toy topper 100 to "snap" into circular openings of different sizes. This flexibility may also account for dimensional variability.

Other types of fasteners 130 can be used as well to allow the pet toy topper 100 to be interchangeable and modular with other items or products. In one example, the threads may be used, such that the interchangeable base 110 can be screwed into the opening 141 of the item 140. In other examples, the interchangeable base 110 may simply be sized and shaped to allow the lower or bottom portion 114 of the base 110 to nest within the opening 141 of the item 140. Similarly, the lower or bottom portion 114 of the base 110 may be pressure fitted within the opening 141 of the item 140 (e.g., by pressing the lower or bottom portion 114 of the base 110 into the opening 141 of the item 140).

FIG. 7 also illustrates that the bottom coupler 120*b* of the toy end assembly 120 can be removably coupled to the interchangeable base 110, specifically the upper portion 113 of the base 110, as described below with regard to FIG. 8.

Figure 8:
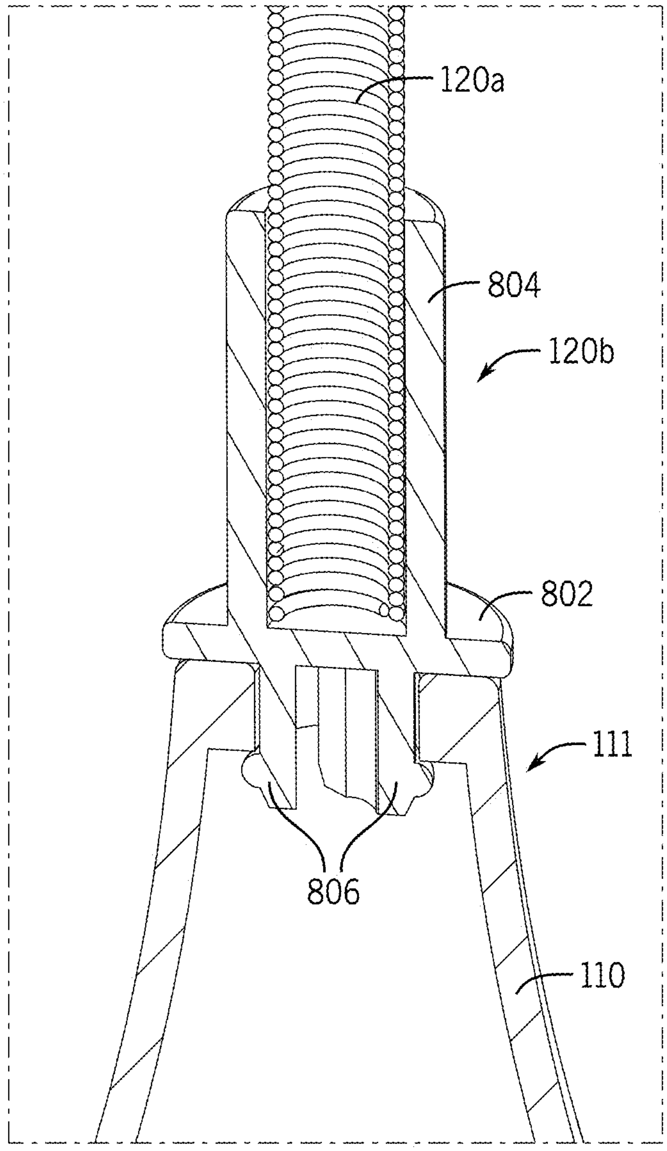
FIG. 8 depicts an enlarged cross-sectional view of the coupling between the pet toy topper and item of FIG. 7 according to one embodiment.

FIG. 8 is an enlarged view of the removable connection between the bottom coupler 120*b* of the toy end assembly 120 and the distal end 111 of the upper portion 113 of the interchangeable base 110 described above in FIG. 7. As shown in FIG. 8, the bottom coupler 120*b* may be a removable connection device or coupler, such as a snap-fit connection. The bottom coupler 120*b* may include a central disk or body 802, an upper sleeve 804 extending vertically upward and away from the central disk or body 802 and configured to receive the stem 120*a*, such as a spring or other elongate member, and protruding arms 806 extending vertically downward and away from the central disk or body 802. Other types of removable connections are possible, such as press-fit and screw-type connections. This allows for varying types of toy end assemblies 120 to be attached to the interchangeable base 110. As described below, the bottom coupler 120*b* may also be used to connect or attach the toy end assembly 120 to other products, such as a scratch pad adapter or insert.

Figure 9:
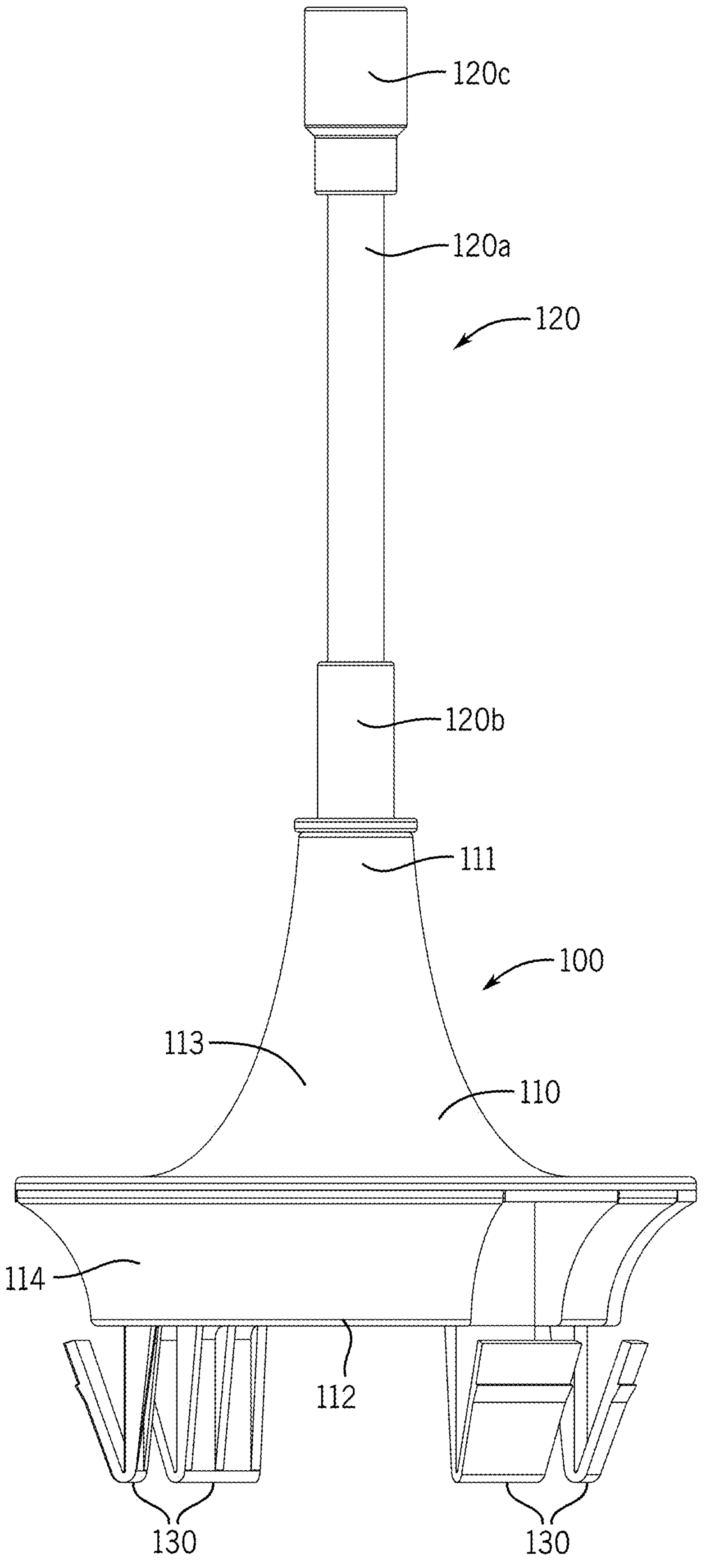
FIG. 9 depicts another pet toy topper with an interchangeable base according to one embodiment.

FIG. 9 shows another example of the toy end assembly 120 attaching to the base 110. As shown in FIG. 9, the toy end assembly 120 may include a stem 120*a* (such as a spring inside a flexible cover, sheath, or sleeve), a bottom coupler 120*b* for connecting the toy end assembly 120 (specifically the stem 120*a*) to the base 110, and a toy connector 120*c* for connecting a toy 124 to the stem 120*a* of the toy end assembly 120. The bottom coupler 120*b* may be the snap-fit component shown in FIG. 8. Other types of connection components are possible, such as screw-in, press fit, or other mating connection components. In one example, the stem 120*a* may include a flexible housing designed to enclose and protect a spring. The flexible housing may also be designed to limit the extent to which the spring may bend. The toy connector 120*c* may include many different types of connection arrangements to allow varying toys/attachments 124 to couple to the toy end assembly 120.

Figure 10:
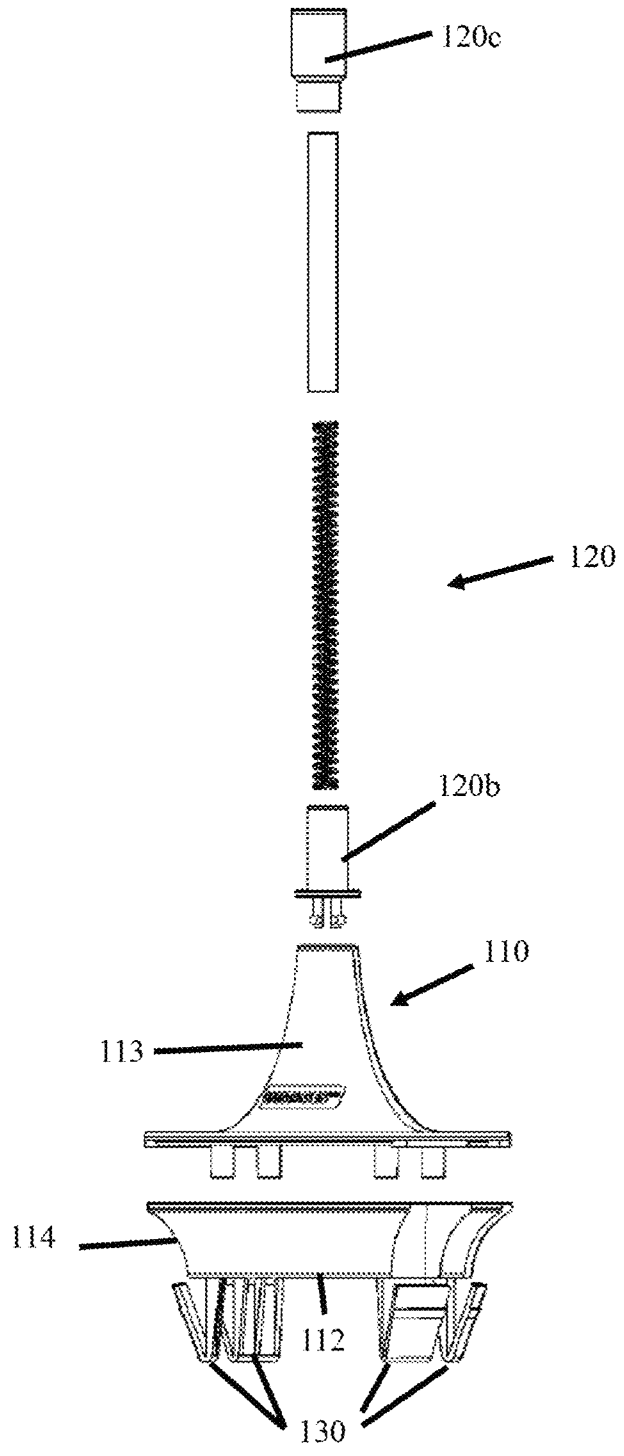
FIG. 10 depicts an exploded side view of the pet toy topper of FIG. 9 according to one embodiment.

FIG. 10 shows an exploded view of the components of the toy end assembly 120 described above in FIG. 9.

Figure 11:
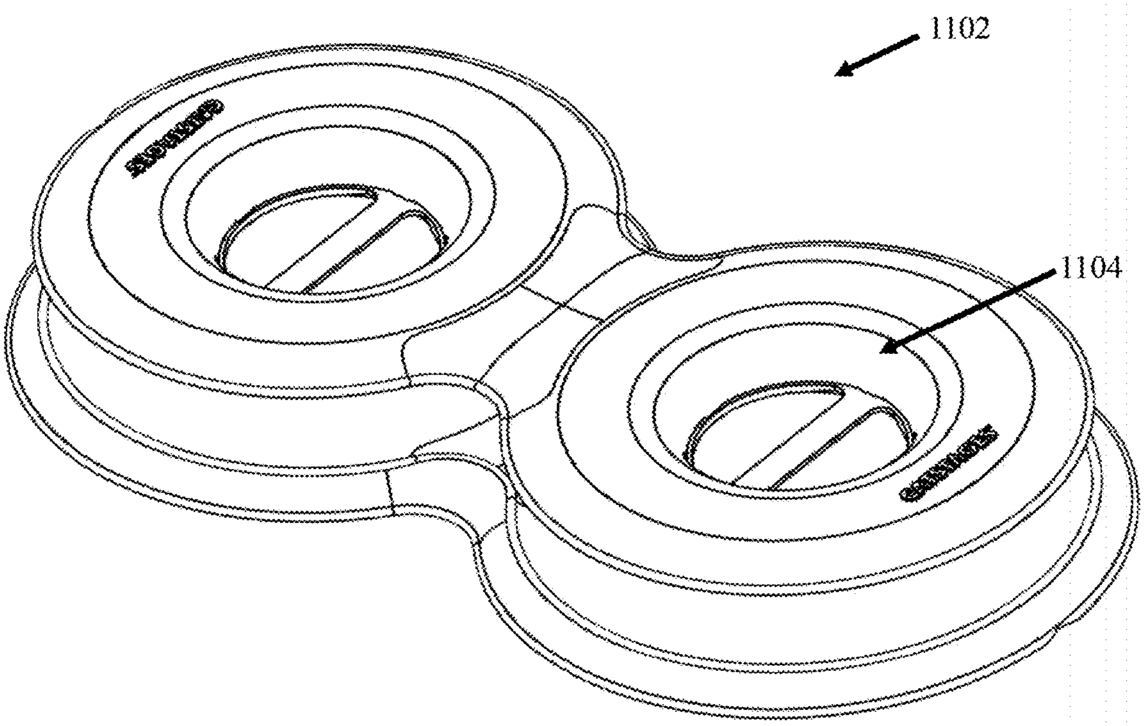
FIG. 11 depicts another item to which a pet toy topper can attach according to one embodiment.

Referring back to FIG. 6, as shown, the toy topper 100 is attached or coupled to an item 140 or toy 140 having multiple tracks stacked in a tower configuration. However, the toy topper 100 may be inserted into, or coupled together with, other items or products. For example, as shown in FIG. 11, the item or toy 1102 may be a pair of connected circular tracks in a "figure 8" configuration or shape having an opening 1104 in the middle of each circular track. The opening 1104 may be the same as the opening portion 141 of the item or toy 140 of FIG. 7, such that a plurality of fasteners 130 of the interchangeable base 110 are configured to engage/connect with the opening 1104 of the item or toy 1102, such as a lip portion similar to the lip portion 142 of the item or toy 140 of FIG. 7.

Figure 12:
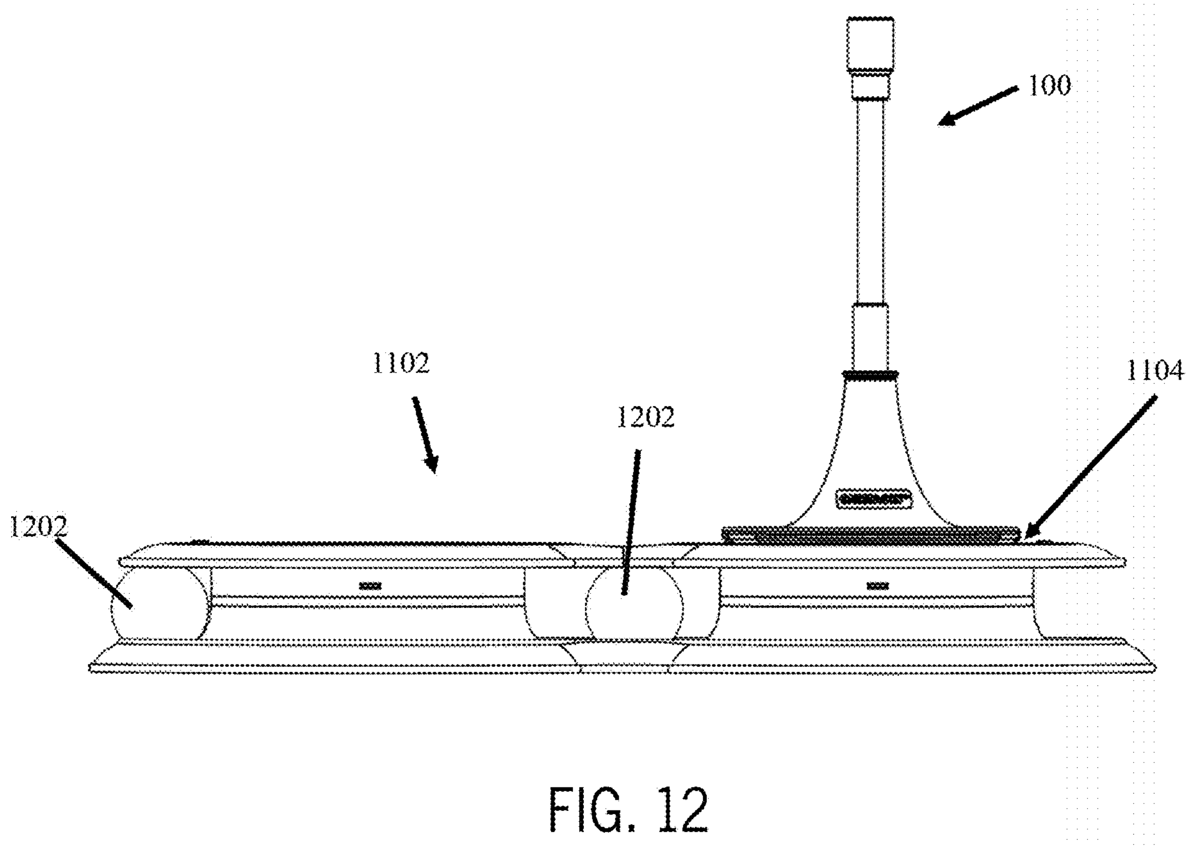
FIG. 12 depicts a side view of the item of FIG. 11 with the pet toy topper of FIG. 9 coupled therewith according to one embodiment.

FIG. 12 is a side view of the item or toy 1102 of FIG. 11 with a toy topper 100 coupled therewith. As shown in FIG. 12, the bottom portion of the toy topper 100 is nested within the opening 1104 of the item or toy 1102. FIG. 12 also shows balls 1202 within the tracks of the toy 1102.

Figure 13:
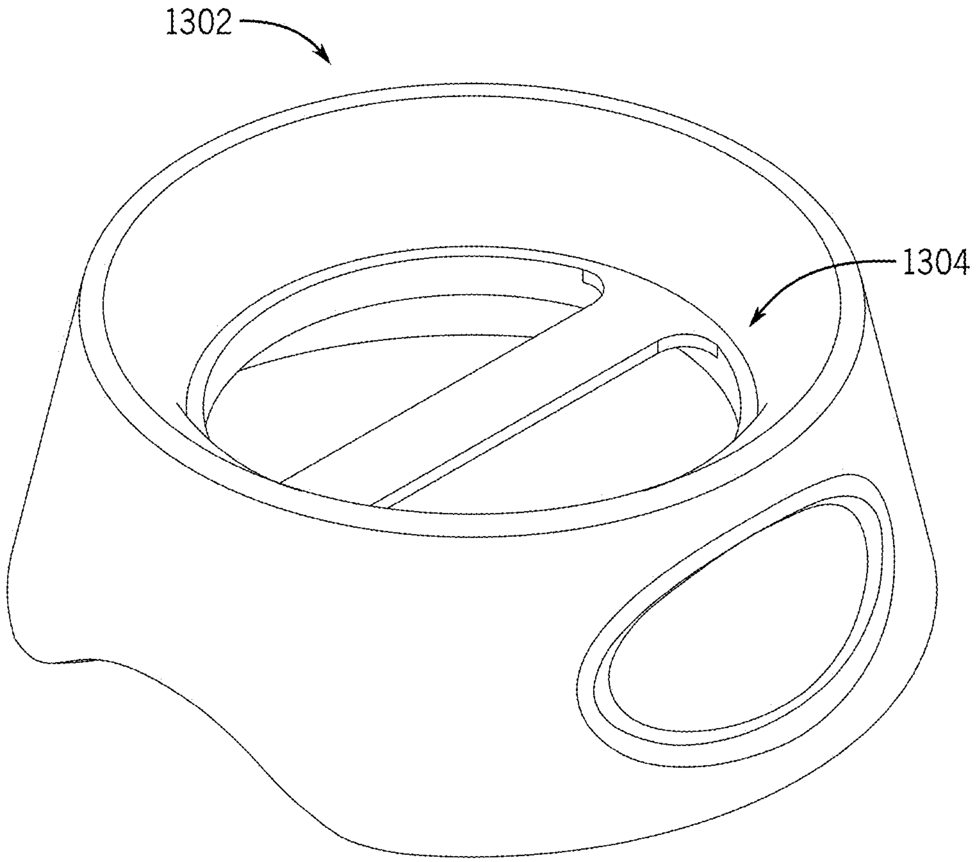
FIG. 13 depicts another item to which a pet toy topper can attach according to one embodiment.

FIG. 13 is another embodiment of an item or product 1302 into which the disclosed toy topper 100 may be inserted and attached. The item or product 1302 of FIG. 13 may be an individual base for the toy topper 100, such that each toy topper 100 can be turned into a stand-alone toy. The item or product 1302 may have an anti-slip base, such as a rubber bottom mold. The item or product 1302 includes an opening 1304, which may be the same as the opening portion 141 of the item 140 of FIG. 7, such that a plurality of fasteners 130 of the interchangeable base 110 are configured to engage/connect with the opening 1304 of the item or product 1302, such as a lip portion similar to the lip portion 142 of the item 140 of FIG. 7. In this regard, this item or product 1302 may act as a "universal" base that is capable of receiving all toy toppers 100 having the same interchangeable base and fastening system.

Figure 14:
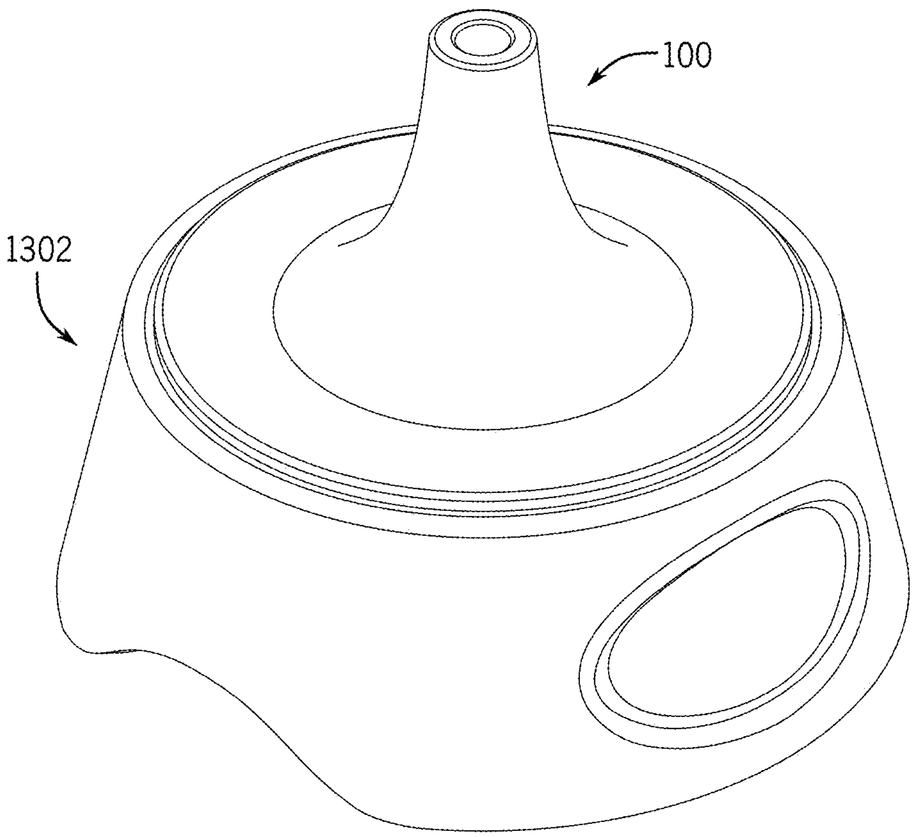
FIG. 14 depicts a perspective view of the item of FIG. 13 with a toy topper coupled therewith according to one embodiment.

FIG. 14 is a perspective view of the item or product 1302 of FIG. 13 with a toy topper 100 coupled therewith. As shown in FIG. 14, the bottom portion of the toy topper 100 is nested within the opening 1304 of the item or product 1302.

Figure 15:
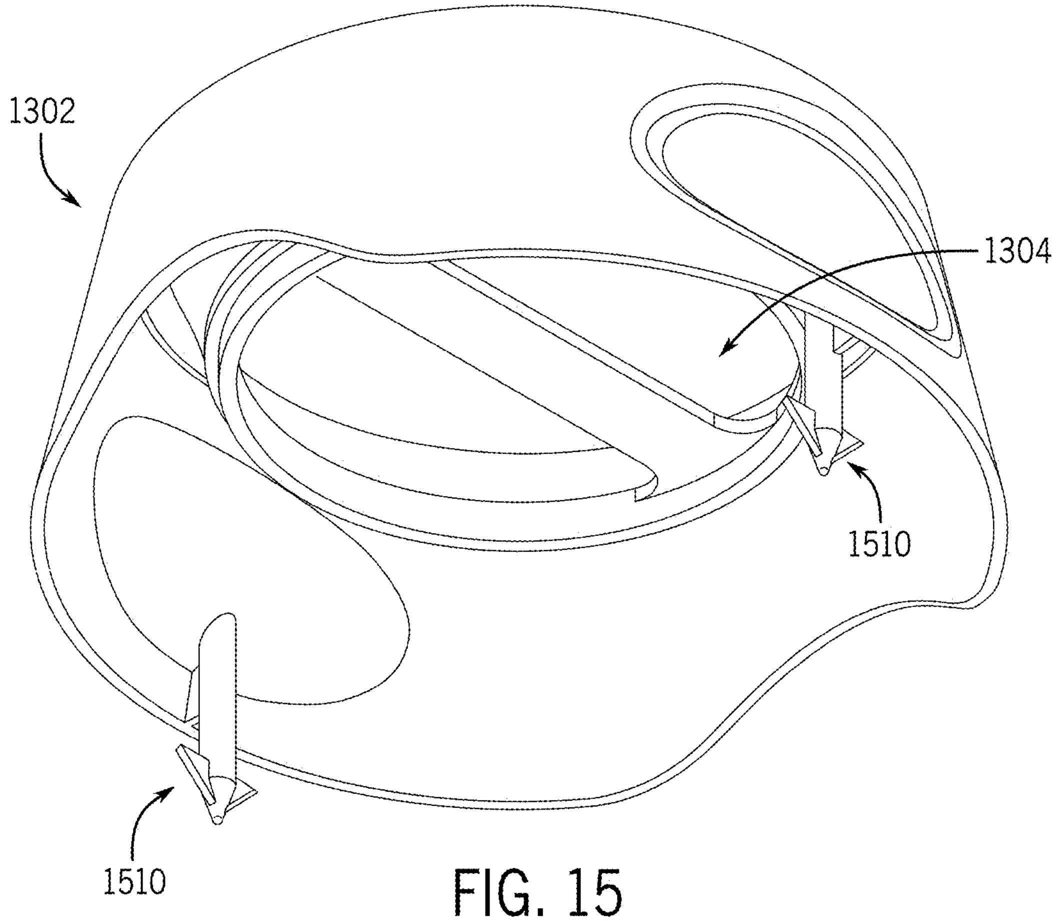
FIG. 15 depicts a bottom perspective view of the item of FIG. 13 having different fastening members.

In other embodiments, the disclosed toy toppers 100 may be inserted into, or coupled together with, other items or products such as pet scratch products, such as scratch pads. For example, pet scratchers or scratch pads made of corrugated fiberboard, corrugated cardboard, or other types of packaging material may also be used with the disclosed toy toppers 100 to vary and enhance the product. In this example, each of the toy toppers 100 discussed above may include different fastening members extending from the bottom of the interchangeable base. In another example, as shown in FIG. 15 below, a "universal" base may include these scratch pad fasteners and, since each of the toy toppers 100 discussed above may nest within the universal base, each topper 100 is capable of being implemented in scratch pad products. In some examples, as discussed below, the fasteners may include pegs, posts, shafts, or the like with protruding shoulders and/or barbs to penetrate the material of the scratch pads, such as corrugated cardboard for example, and hold the toy topper 100 in place.

For example, FIG. 15 depicts the item or product 1302 of FIG. 13 having two fasteners 1510 in the form of pointed shafts or rods with barbs protruding on two sides of the pointed end of the shaft. In one example, the barbs are triangular shaped. In this way, the fasteners 1510 are similar to spikes or arrows that, when pushed into a product made of corrugated cardboard, for example, penetrate the corrugated cardboard and resist being pulled out because of the barbs. Other types of barbed rods or stems may be used that allow the item or product 1302 to be pressed into a material such as corrugated cardboard that resists being pulled out due to the barbs or protrusions along the rod or stem.

These same type of fasteners 1510 may be used with any of the toy toppers 100 discussed herein. However, since the item or product 1302 of FIG. 15 is the same as that of FIGS. 13 and 14 discussed above, and since the item or product 1302 of FIGS. 13 and 14 is described as being a "universal" base (i.e., a stand-alone base with an opening capable of receiving the interchangeable base 110 of toy toppers 100), the item or product 1302 of FIG. 15 also acts as, and may be referred to hereinafter as, a universal scratch pad adapter (i.e., topper 100 adaptable scratch pad insert), since it allows any toy topper 100 to be used with a scratch pad. To use the product 1302 of FIG. 15 in this way, a user would attach the product 1302 to a scratch pad (by pressing the scratch pad fasteners 1510 into the scratch pad) and then attach any toy topper 100 to the product 1302 (by "snapping" the press-fit fasteners 130 of the base 110 of the topper 100 into the opening 1304 of the product 1302).

Figure 16:
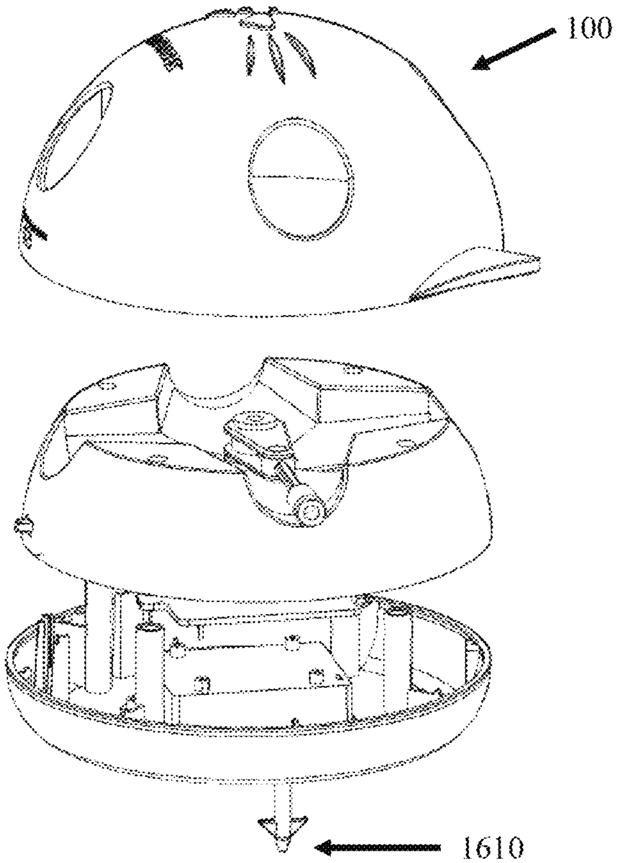
FIG. 16 depicts a partial exploded perspective view the toy topper of FIGS. 4A-4D according to another embodiment.

FIG. 16 depicts the toy topper 100 of FIGS. 4A-4D according to another example. In the example shown in FIG. 16, the toy topper 100 is the same or similar to the toy topper 100 of FIGS. 4A-4D except that instead of press-fit fasteners extending from the bottom of the interchangeable base, the toy topper 100 of FIG. 16 contains fasteners 1610 the same or similar as the fasteners 1510 discussed above for FIG. 15. In this example, rather than attaching to the universal scratch pad adapter 1302, the topper 100 of FIG. 16 can be directly attached to a scratch pad without using the universal scratch pad adapter 1302.

Figure 17:
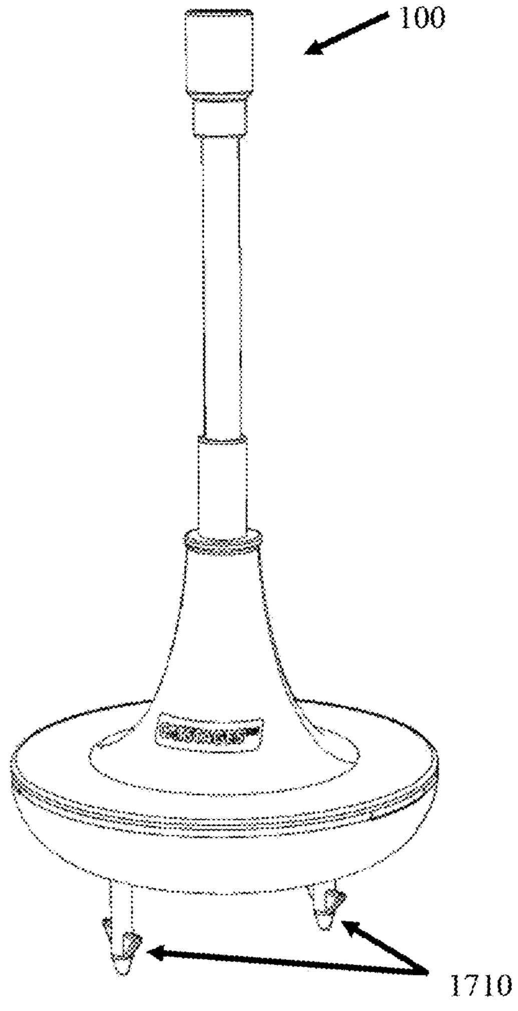
FIG. 17 depicts a perspective view of the toy topper of FIGS. 1 and 6-10 according to another embodiment.

FIG. 17 depicts the toy topper 100 of FIGS. 1 and 6-10 according to another example. In the example shown in FIG. 17, the toy topper 100 is the same or similar to the toy topper 100 of FIGS. 1 and 6-10 except that instead of press-fit fasteners extending from the bottom of the interchangeable base, the toy topper 100 of FIG. 17 contains fasteners 1710 the same or similar as the fasteners 1510 discussed above for FIG. 15. In this example, rather than attaching to the universal scratch pad adapter 1302, the topper 100 of FIG. 17 can be directly attached to a scratch pad without using the universal scratch pad adapter 1302.

Figure 18:
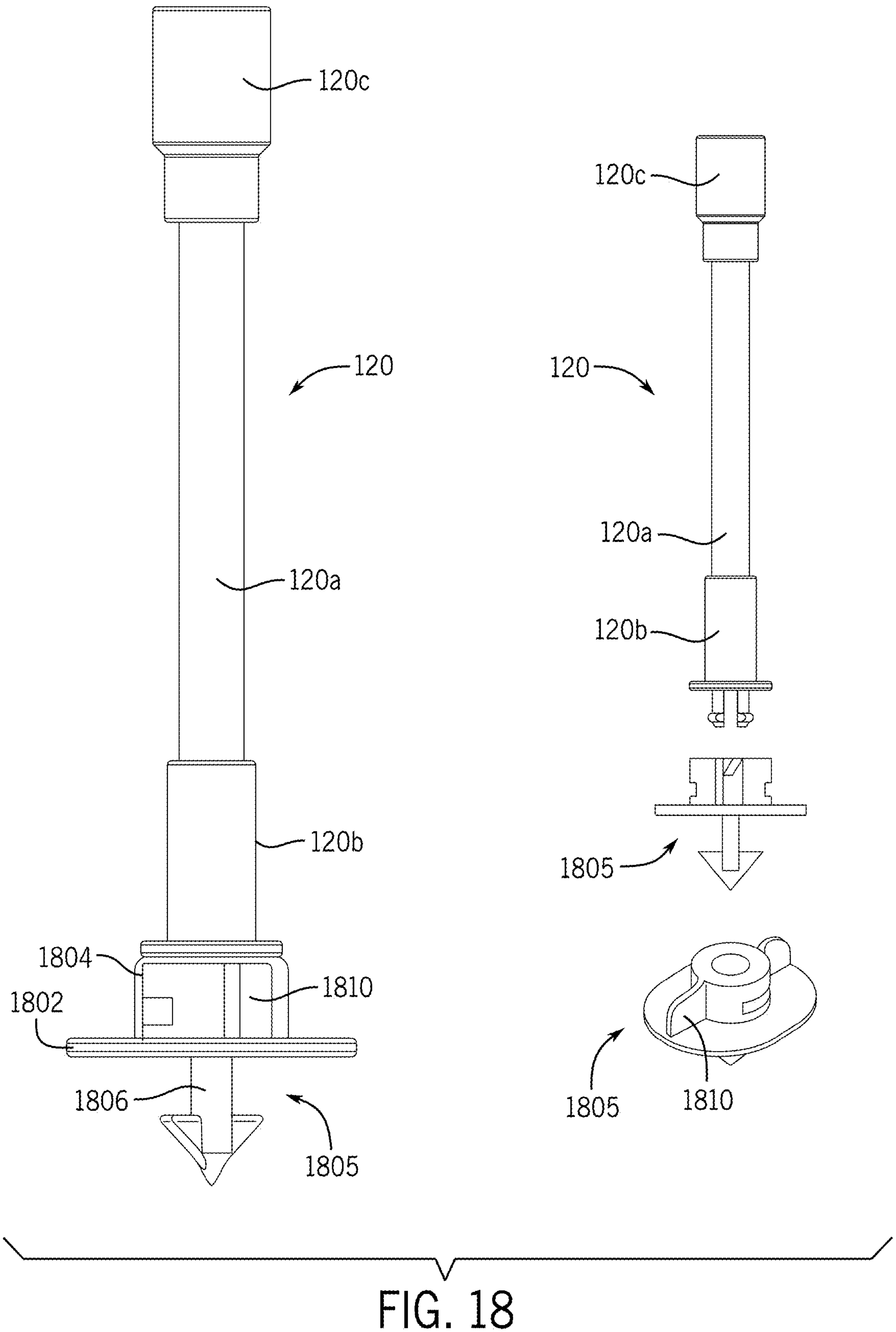
FIG. 18 depicts a side view and a partial exploded side view of the toy end assembly of FIGS. 9 and 10 according to another embodiment.

FIG. 18 depicts an example of a toy end assembly 120 being used with a scratch pad insert. The toy end assembly 120 of FIG. 18 may be the same toy end assembly 120 as those described above. For example, the toy end assembly 120 of FIG. 18 may include a stem **120*a* (such as a spring inside a flexible cover, sheath, or sleeve), a toy connector 120*c* for connecting a toy 124 to the stem 120*a* of the toy end assembly 120, and a bottom coupler 120*b* for connecting the toy end assembly 120 (specifically the stem 120*a*) to another item or product. In the example shown in FIG. 18, the other item or product 1805 is different type of scratch pad adapter or insert 1805. This smaller scratch pad insert 1805 may be used with any toy assembly 120 having a bottom coupler 120*b* as those shown and described herein. Similar to the bottom coupler 120*b* described above, the bottom coupler 120*b* of FIG. 18 includes a central disk, upper sleeve, and protruding arms. The scratch pad insert 1805 may include a central base plate or platform 1802, a housing 1804 disposed on the central base plate 1802, and a scratch pad fastener 1806. The housing 1804 includes a cavity into which the protruding arms of the bottom coupler 120*b* are received. In one example, the connection between the protruding arms of the bottom coupler 120*b* and the cavity of the housing 1804 may be a snap fit connection. Other types of connection are possible. The housing 1804 may also include one or more outwardly protruding walls or wings 1810, such that the housing 1804 resembles a wing nut. The wings 1810 allow a user to twist the scratch pad insert 1805 after the scratch pad insert 1805 has been pressed into a scratch pad (e.g., corrugated cardboard). This allows the barbs of the scratch pad fastener 1806** to "lock" onto material to resist being removed.

Figure 19:
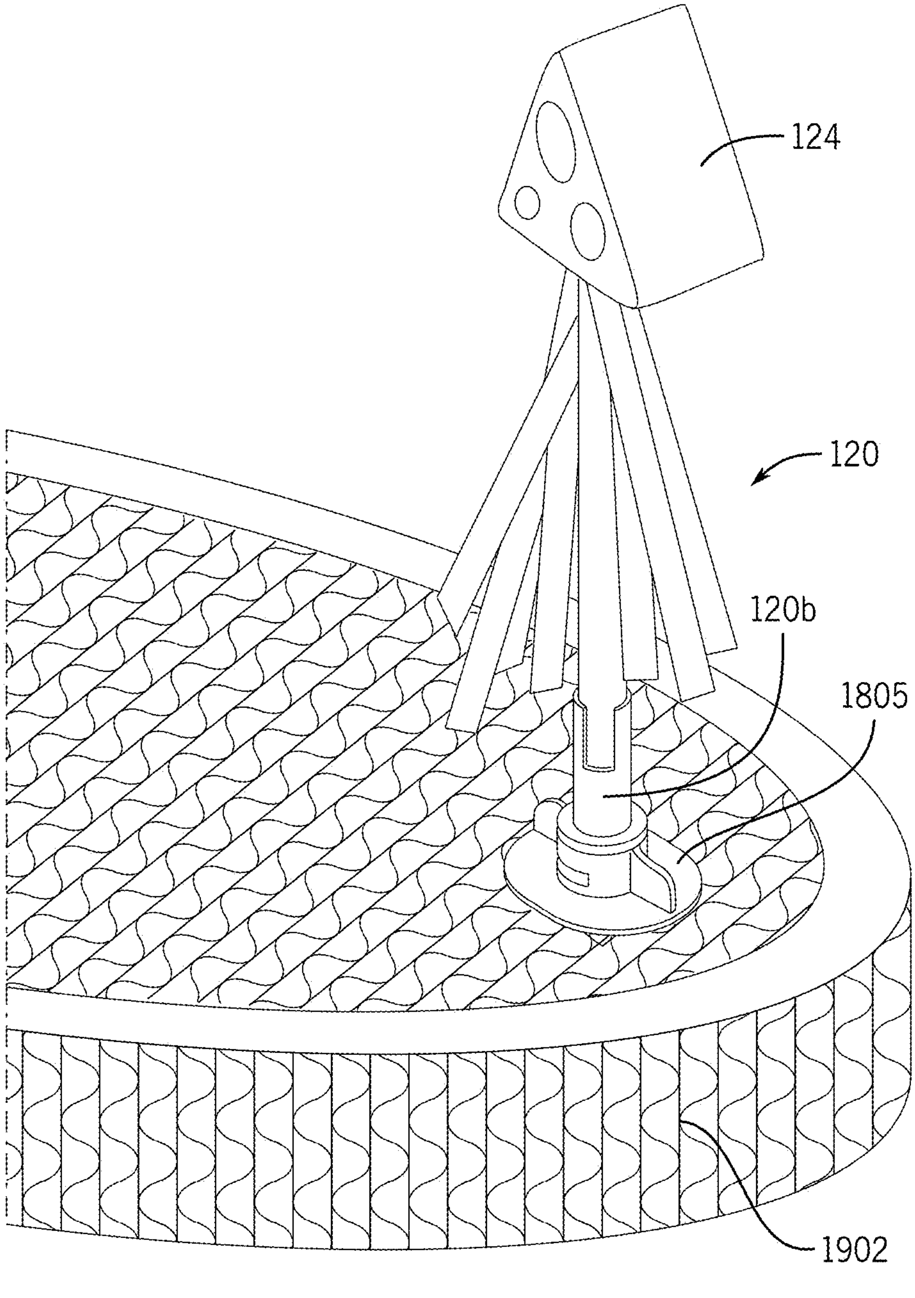
FIG. 19 depicts the toy end assembly of FIG. 18 coupled to an item according to one embodiment.

FIG. 19 illustrates a toy 124 inserted into a toy end assembly 120, which is inserted into a scratch pad insert 1805, which is inserted into a scratch pad 1902.

Figure 20:
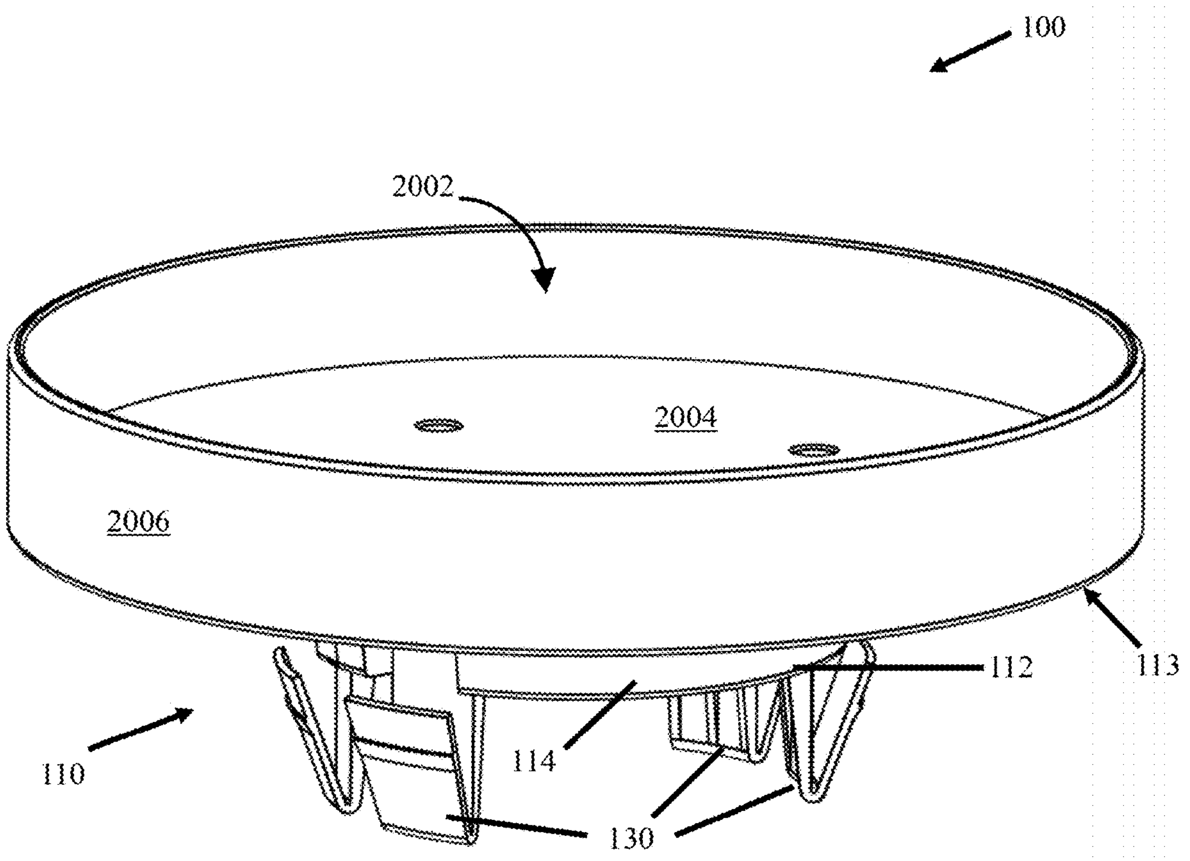
FIG. 20 depicts another toy topper with an interchangeable base according to another embodiment.

FIG. 20 depicts another toy topper 100 according to another embodiment. The toy topper 100 of FIG. 20 includes an interchangeable base 100, such as those described above. The interchangeable base 110 includes a top portion 113 and a bottom portion 114. A plurality of fasteners 130 extend from the bottom or proximate end 112 of the bottom portion 114 of the base 110. In the example shown in FIG. 20, the fasteners 130 are press fit fasteners 130. Other types of fasteners 130 may be used, such as those described above relating to connecting to scratch pads (e.g., scratch pad fasteners). In one example, as shown in FIG. 20, the top portion 113 of the interchangeable base 110 includes a cylindrical basin or bowl 2002 having an opening or cavity defined by a circular planar support plate or surface 2004 and a sidewall 2006 extending around the perimeter of the support plate 2004.

The cavity of the bowl 2002 may be configured to receive any number of things, including treats (in which the bowl 2002 functions as a food bowl on top of a toy) or a scratch pad, similar to the scratch pad 1902 shown in FIG. 19. Inserting a scratch pad into the bowl 2002 provides the option of attaching a scratch pad to other toys or products, such as those described above. Further, if a scratch pad is inserted into the cavity of the bowl 2002, the scratch pad insert 1805 described above may be used, thereby providing another level of modularity to toys. For example, a toy 124 may be inserted into a toy end assembly 120, which may be inserted into a scratch pad insert 1805, which may then be inserted into a scratch pad, which may then be inserted into the cavity of the bowl 2002 of the toy topper 100 of FIG. 20, which itself may be coupled to the top of another item or product, such as another toy, resulting in numerous levels of toys.

Figure 21:
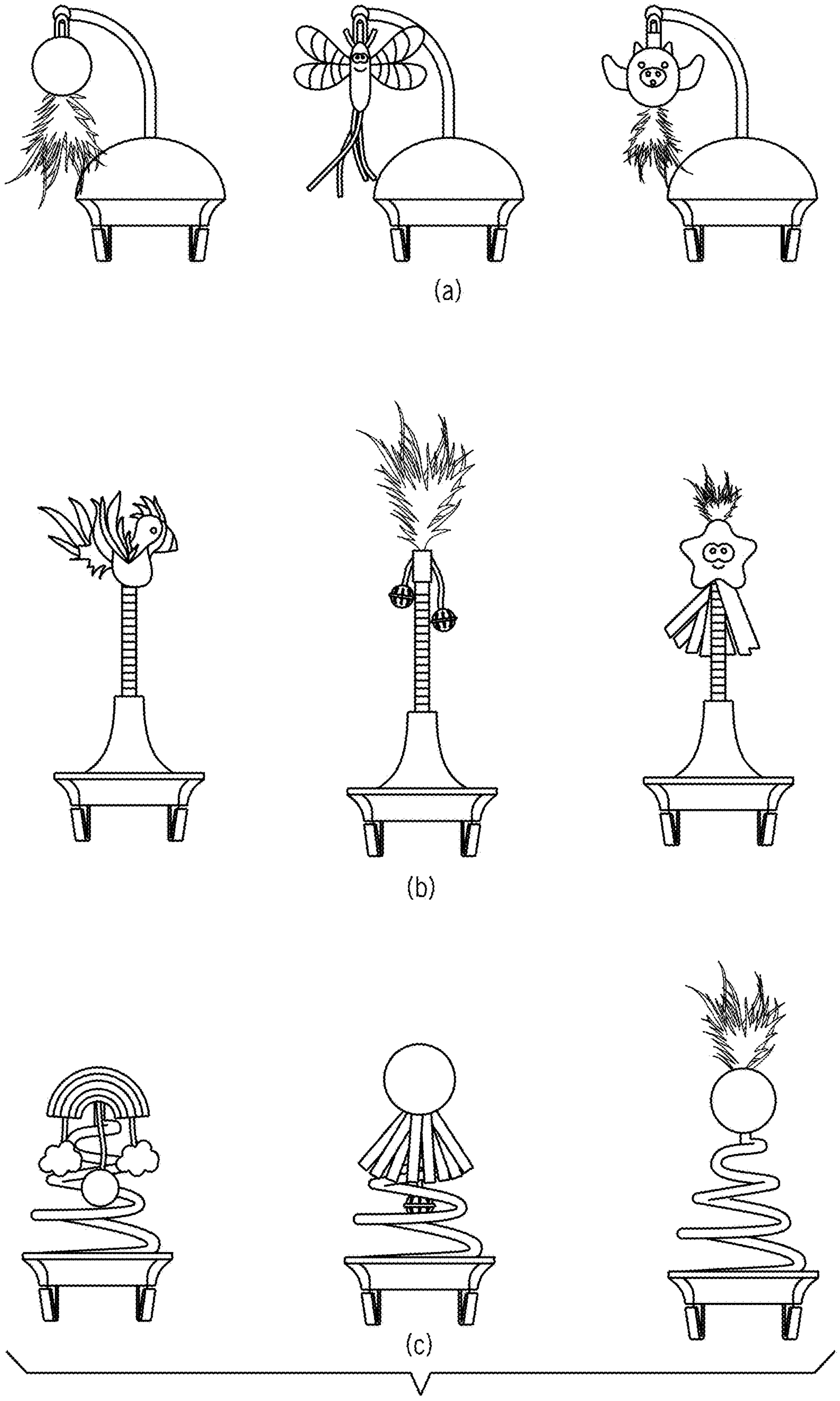
FIG. 21 depicts varying toy toppers according to different embodiments.

FIG. 21 shows an assortment of varying types of toy connection assemblies (i.e., interchangeable bases 110 and toys 124 attached thereto). As shown in FIG. 21, while the lower portion 114 of the interchangeable bases 110 may all be the same, the upper portion 113 of the interchangeable bases 110 may vary significantly. In some examples, such as those shown in FIG. 21(*a*), the upper portion 113 of the base 110 is dome-shaped. In other examples, such as those shown in FIG. 21(*b*), the upper portion 113 is conically shaped with a straight elongate member protruding outward, such as a spring. In yet other examples, such as those shown in FIG. 21(*c*), the upper portion 113 is spiral-shaped. In other examples, the upper portion 113 includes at least two protruding arms 117 with a toy 124 disposed therebetween. In yet other examples, the upper portion 113 of the base 110 includes radially extending portions 117 that may rotate or be fixed with toys/lures/attractants 124 attached at the ends 123. In yet another example, the upper portion 113 of the base 110 includes openings passing through the upper portion 113, where a toy 124, attached to the upper portion 113, can pass through/between/in and out of the openings. The toys 124 attached to the end 123 of the elongate member 121 or members may vary as well. As shown, the toys 124 can be plush or plastic toys 124 having feathers, faux fur, dangling balls or bells, or combinations thereof. In some cases, the toys 124 resemble other animals that may entice a pet to interact with the toy 124.

Figure 22:
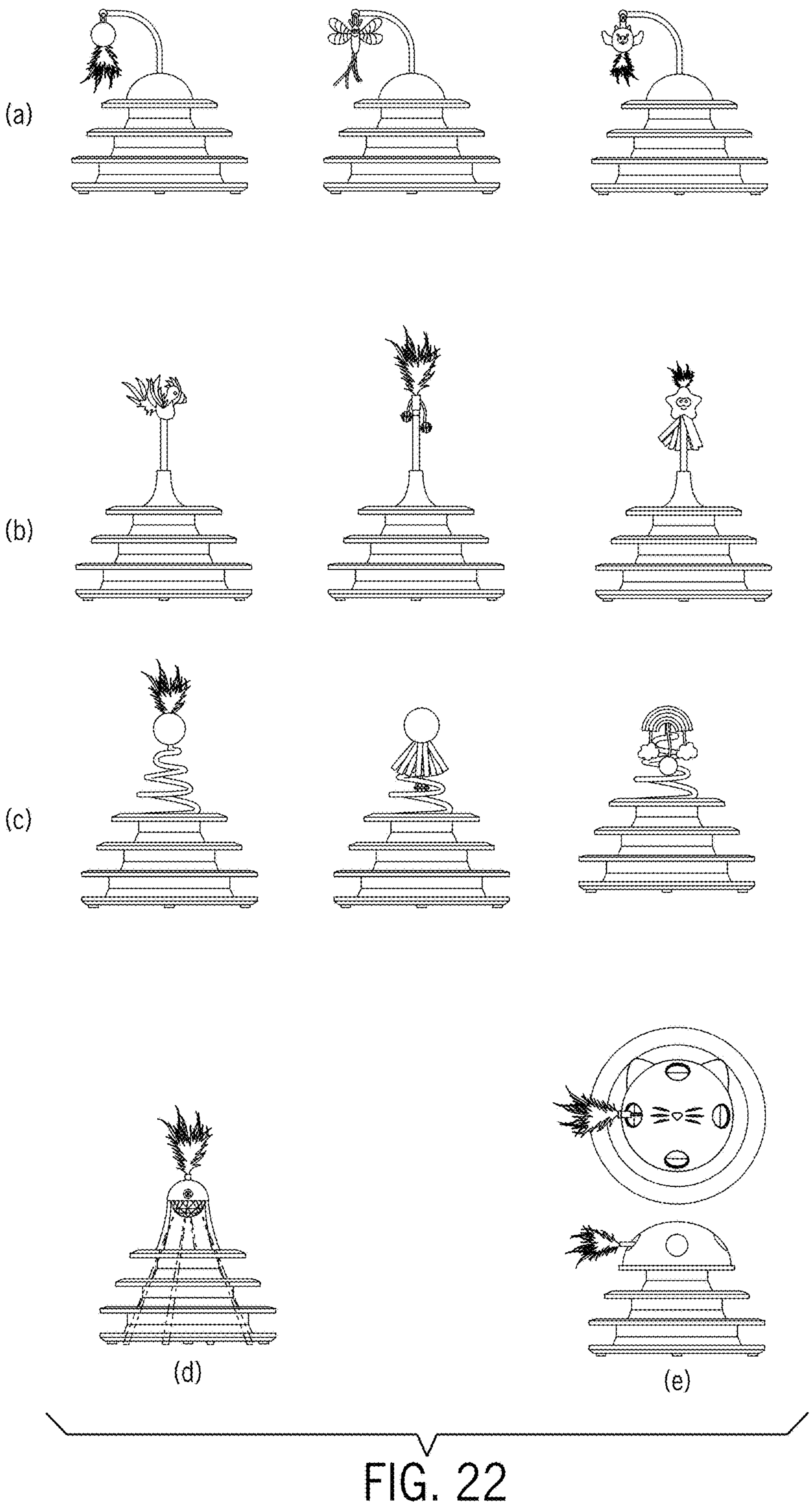
FIG. 22 depicts varying toy toppers coupled to an item according to different embodiments.

FIG. 22 shows the toy connection assemblies of FIG. 21 attached to an item, such as another product or toy 140. In this example, all of the toy connection assemblies of FIG. 21 are attached to the same item or toy—a toy 140 having multiple tracks stacked in a tower configuration. The toy connection assemblies may be configured to attach to other items or toys 140 as well, as described above. The toy connection assemblies of row (a) of FIG. 22 correspond to the toy toppers 100 of FIGS. 2A-2C. The toy connection assemblies of row (b) of FIG. 22 correspond to toy toppers 100 of FIGS. 1 and 6-10. The toy connection assemblies of row (c) of FIG. 22 are similar to those of row (b), but with a different spring mechanism. The toy connection assembly shown by FIG. 22(*d*) corresponds to the toy topper 100 of FIG. 3 and the toy connection assembly shown by FIG. 22(*e*) corresponds to the toy topper 100 of FIGS. 4A-4D.

The disclosed modular toy system described herein allows for many different toys to be interchanged between each other. For example, any toys with the connection components described herein can be interchanged with each other. In this way, toy toppers can be used and interchanged between various products, including other toys and scratch pads. Having the ability to modularize toys, such as those shown above, with a pet toy topper allows variation and added fun to those toys.

While the interchangeable product described herein is often referred to as a toy "topper" (because in various embodiments it is configured to couple or rest/nest on top of another item or product), the disclosed interchangeable base and toy end assemblies may be configured to couple/attach or rest/nest to different sides or locations of other items or products. For example, the "toppers" or toy end assemblies disclosed herein may be configured to couple to the side of an item or product.

While the present disclosure has been described with reference to specific examples, which are intended to be illustrative only and not to be limiting of the disclosure, it will be apparent to those of ordinary skill in the art that changes, additions, and/or deletions may be made to the disclosed embodiments without departing from the spirit and scope of the disclosure.

The foregoing description is given for clarity of understanding only, and no unnecessary limitations should be understood therefrom, as modifications within the scope of the disclosure may be apparent to those having ordinary skill in the art.

When a component, device, element, or the like of the present disclosure is described as having a purpose or performing an operation, function, or the like, the component, device, or element, should be considered herein as being "configured to" meet that purpose or perform that operation or function.

What is claimed is:

1. An apparatus for interaction of a pet animal, the apparatus comprising:

a first pet toy with an interchangeable base having a distal end and a proximate end;

a toy end assembly coupled to the distal end of the interchangeable base; and at least one fastener extending from the proximate end of the interchangeable base, wherein the at least one fastener is configured to removably couple the interchangeable base of the first pet toy to a second pet toy, wherein a size and shape of the proximate end of the interchangeable base corresponds to an opening in the second pet toy, such that the proximate end of the interchangeable base of the first pet toy is configured to at least partially nest within the opening of the second pet toy, wherein the first pet toy includes a first movable object to attract the pet animal, the first movable object being movable relative to the interchangeable base and the second pet toy, and wherein the second pet toy includes a second movable object to attract the pet animal, the second movable object being movable relative to the interchangeable base and a body of the second pet toy.

2. The apparatus of claim 1, wherein the interchangeable base comprises:

a first portion including the proximate end of the interchangeable base, wherein the at least one fastener is coupled to the first portion; and a second portion coupled to and extending away from the first portion, the second portion including the distal end of the interchangeable base, wherein the toy end assembly is coupled to the second portion.

3. The apparatus of claim 2, wherein a size and a shape of the first portion corresponds to the opening in the second pet toy, such that the first portion is configured to at least partially nest within the opening of the second pet toy.

4. The apparatus of claim 2, wherein the first portion comprises a power source to control a movement of the toy end assembly.

5. The apparatus of claim 2, wherein the second portion is dome-shaped, conically shaped, or spiral-shaped.

6. The apparatus of claim 2, wherein the second portion comprises a plurality of protruding arms and wherein the toy end assembly is disposed between the plurality of protruding arms.

7. The apparatus of claim 2, wherein the second portion comprises a motorized component that controls a movement of the toy end assembly.

8. The apparatus of claim 2, wherein the toy end assembly is movably coupled to the second portion.

9. The apparatus of claim 1, wherein the toy end assembly comprises:

an elongate member having a first end and a second end, the first end being coupled to the distal end of the interchangeable base; and the first movable object coupled to the second end of the elongate member.

10. The apparatus of claim 9, wherein the elongate member is arcuate and wherein the first end is rotatably coupled to the distal end of the interchangeable base, such that the elongate member and first movable object are rotatable in relation to the interchangeable base.

11. The apparatus of claim 9, wherein the elongate member is flexible, such that the first movable object is movable in relation to the interchangeable base.

12. The apparatus of claim 9, wherein the first movable object is removably coupled to the second end of the elongate member, such that the first movable object is interchangeable.

13. The apparatus of claim 1, wherein the toy end assembly is designed to entice interaction of the pet animal.

14. The apparatus of claim 1, wherein the at least one fastener comprises a press fit fastener.

15. The apparatus of claim 1, wherein the at least one fastener comprises snaps, threads, magnets, or combinations thereof.

16. A toy connection assembly comprising:

a base;

a first pet toy coupled to one end of the base; and a fastener extending from another end of the base, wherein the fastener is configured to removably couple the base to a second pet toy different from the first pet toy, wherein a size and shape of the other end of the base corresponds to an opening in the second pet toy, wherein each of the first pet toy and the second pet toy includes a movable object to attract a pet, the movable object being movable relative to the base and the other of the first pet toy or second pet toy, respectively.

17. An interchangeable toy system comprising:

a first pet toy having a receptacle; and a set of other toys, wherein each toy of the set of other toys is selectable and removably attachable to the receptacle of the first pet toy, wherein a respective toy of the set of other toys includes:

an adapter configured to removably couple the respective toy to the receptacle of the first pet toy, the adapter including a plurality of fasteners extending away from an end of the adapter; and a plaything removably attachable to the adapter, wherein the first pet toy includes a movable object to attract a pet, the movable object being movable relative to the receptacle and the adapter of the respective toy of the set of toys.

18. The interchangeable toy system of claim 17, wherein the adapter includes an end portion configured to be received by the receptacle of the first pet toy, wherein the end portion of the adapter and the plurality of fasteners together define a modular coupling interface having a predetermined geometry corresponding to the receptacle of the first pet toy, the modular coupling interface being configured to be repeatedly attached to and detached from the first pet toy by nesting engagement between the end portion of the adapter and the receptacle of the first pet toy.

19. The interchangeable toy system of claim 18, wherein the plaything of each toy of the set of other toys is different from each other, such that the first pet toy is selectively couplable to different playthings via respective adapters of respective toys of the set of toys.

* * * * *